(12) United States Patent
Kim et al.

(10) Patent No.: US 10,827,738 B2
(45) Date of Patent: Nov. 10, 2020

(54) INSECT TRAP USING UV LEDS

(71) Applicant: SEOUL VIOSYS CO., LTD., Ansan-si (KR)

(72) Inventors: Jong Rack Kim, Ansan-si (KR); Chung Hoon Lee, Ansan-si (KR); Kyu Won Han, Ansan-si (KR); Sang Hyun Chang, Ansan-si (KR)

(73) Assignee: SEOUL VIOSYS CO., LTD., Ansan-si (KR)

( * ) Notice: Subject to any disclaimer, the term of this patent is extended or adjusted under 35 U.S.C. 154(b) by 226 days.

(21) Appl. No.: 15/860,608

(22) Filed: Jan. 2, 2018

(65) Prior Publication Data

US 2018/0271080 A1    Sep. 27, 2018

Related U.S. Application Data

(63) Continuation of application No. PCT/KR2016/005162, filed on May 16, 2016.

(30) Foreign Application Priority Data

Jun. 30, 2015  (KR) .................. 10-2015-0093742
Sep. 25, 2015  (KR) .................. 10-2015-0136545
Sep. 30, 2015  (KR) .................. 10-2015-0137263

(51) Int. Cl.
*A01M 1/04*    (2006.01)
*A01M 1/10*    (2006.01)
(Continued)

(52) U.S. Cl.
CPC ................ *A01M 1/04* (2013.01); *A01M 1/10* (2013.01); *F21V 5/04* (2013.01); *F21V 7/0091* (2013.01);
(Continued)

(58) Field of Classification Search
CPC ........ A01M 1/04; A01M 1/10; F21V 23/0464; F21V 23/0471; F21V 7/06
(Continued)

(56) References Cited

U.S. PATENT DOCUMENTS 10,021,871 B1 *  7/2018  Cogley .............. A01M 1/145
2004/0148846 A1 *  8/2004  Moore .................. A01M 1/08
43/113
(Continued)

FOREIGN PATENT DOCUMENTS

CN      102036554 A    4/2011
CN      102192418 A    9/2011
(Continued)

OTHER PUBLICATIONS

International Search Report in International Application No. PCT/KR2016/005162, dated Aug. 8, 2015.
(Continued)

*Primary Examiner* — Claude J Brown
(74) *Attorney, Agent, or Firm* — Perkins Coie LLP

(57) ABSTRACT

The present invention relates to an insect trap and, more specifically, to an insect trap which uses UV LEDs as light sources for luring insects and is capable of efficiently radiating luring light. The insect trap according to the present invention comprises a UV LED installation part having a plurality of UV LED light sources installed at intervals on the edge of the outer side surface thereof, and a trap part disposed adjacent to the UV LED installation part. The center lines of the ultraviolet light radiation areas of the UV LED light sources installed on the UV LED installation part are arranged substantially radially, extending outward from the center of the insect trap.

19 Claims, 28 Drawing Sheets

(51) Int. Cl.
  *F21V 5/04* (2006.01)
  *F21V 7/00* (2006.01)
  *F21V 7/06* (2006.01)
  *F21V 23/04* (2006.01)
  *F21Y 115/10* (2016.01)

(52) U.S. Cl.
  CPC ............ *F21V 7/06* (2013.01); *F21V 23/0464* (2013.01); *F21V 23/0471* (2013.01); *F21Y 2115/10* (2016.08)

(58) Field of Classification Search
  USPC .......................................................... 43/113
  See application file for complete search history.

(56) References Cited

U.S. PATENT DOCUMENTS

| | | | | |
|---|---|---|---|---|
| 2007/0011940 A1* | 1/2007 | Chen | ........................ | A01M 1/02 43/113 |
| 2007/0056208 A1* | 3/2007 | Chen | ........................ | A01M 1/02 43/113 |
| 2008/0210772 A1* | 9/2008 | Pearce | ................... | A01M 13/00 239/67 |
| 2009/0025275 A1* | 1/2009 | Cohnstaedt | ............. | A01M 1/04 43/113 |
| 2009/0038207 A1* | 2/2009 | Lin | ........................ | A01M 1/04 43/112 |
| 2009/0094883 A1* | 4/2009 | Child | .................... | A01M 1/023 43/112 |
| 2009/0288333 A1 | 11/2009 | Johnston et al. | | |
| 2011/0030266 A1* | 2/2011 | Roy | ........................ | A01M 1/08 43/113 |
| 2011/0051413 A1* | 3/2011 | Hand | ....................... | B29C 45/16 362/235 |
| 2011/0070317 A1 | 3/2011 | Le Huerou et al. | | |
| 2011/0283597 A1* | 11/2011 | Coventry | ............... | A01M 1/023 43/107 |
| 2013/0240928 A1 | 9/2013 | Jang | | |
| 2014/0177232 A1* | 6/2014 | Huang | ....................... | F21V 5/04 362/311.02 |
| 2014/0336495 A1* | 11/2014 | Bittner | ...................... | A61L 2/10 600/410 |
| 2015/0219306 A1* | 8/2015 | Lee | ............... | F21V 5/08 362/97.3 |
| 2016/0000060 A1* | 1/2016 | Sandford | ................. | A01M 1/04 43/113 |
| 2016/0021864 A1* | 1/2016 | Koo | ........................ | A01M 1/08 43/113 |
| 2016/0245916 A1* | 8/2016 | Weber-Grabau | .......... | G01V 8/20 |
| 2017/0258068 A1* | 9/2017 | Eom | ........................ | A01M 1/08 |
| 2018/0172238 A1* | 6/2018 | Camras | .................... | F21S 43/26 |

FOREIGN PATENT DOCUMENTS

| | | |
|---|---|---|
| CN | 103322503 A | 9/2013 |
| CN | 104235719 A | 12/2014 |
| CN | 104285930 A | 1/2015 |
| KR | 20-2011-0008102 U | 8/2011 |
| KR | 10-2012-0078220 A | 7/2012 |
| KR | 10-2014-0137358 A | 12/2014 |

OTHER PUBLICATIONS

English Translation of Office Action from related Chinese Application No. 201680038720A dated Jun. 10, 2020 (15 Pages).

* cited by examiner

FIG. 19A
FIG. 19B
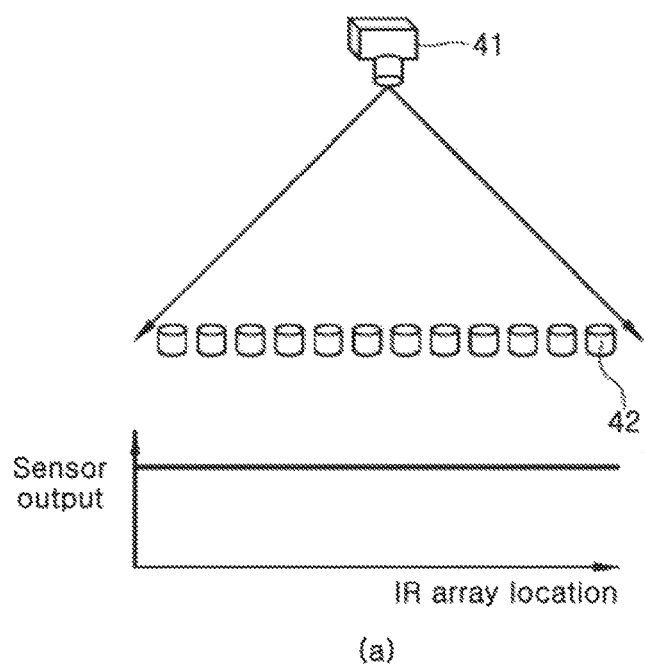
(a)
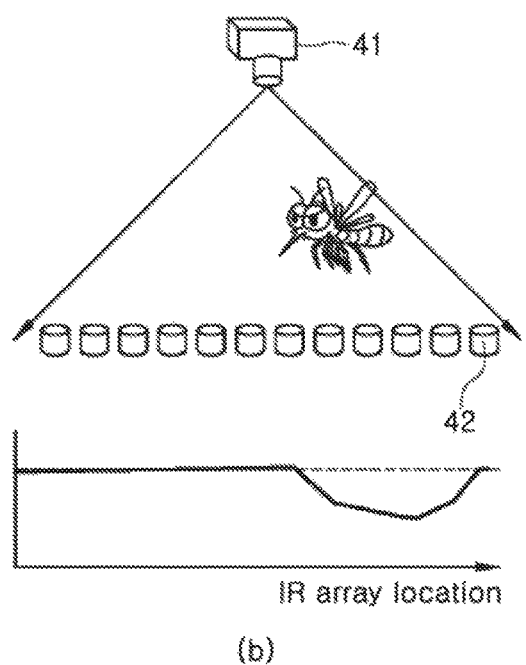
(b)

INSECT TRAP USING UV LEDS

This patent document is a continuation of and claims priority to and the benefit of International Patent Application No. PCT/KR2016/005162, filed May 16, 2016, which claims further priority to Korean Patent Application No. 10-2015-0093742, filed on Jun. 30, 2015, Korean Patent Application No. 10-2015-0136545, filed Sep. 25, 2015, and Korean Patent Application No. 10-2015-0137263, filed Sep. 30, 2015, which are incorporated by reference for all purposes as if fully set forth herein.

TECHNICAL FIELD

The present invention relates to an insect trap and, more particularly, to an insect trap which uses a UV LED as a light source for attracting insects and can efficiently radiate attracting light.

BACKGROUND ART

Recently, the population of insect pests has been increasing due to climatic and social influences such as global warming and eco-friendly policies. In addition to damaging crops and livestock, insect pests can also affect humans by transmitting pathogens such as malaria, dengue fever, and Japanese encephalitis. Therefore, there is continuous demand for deinsectization of the surrounding living environment, and accordingly, deinsectization-related industries are also growing.

Conventionally, there have been proposed chemical control using pesticides, biological control using loaches or the like, physical control that attracts insect pests using a black light trap, carbon dioxide, or the like, followed by application of high voltage to kill the insect pests, and environmental control that improves the surrounding environment by eliminating water puddles in which larvae of insects can grow. However, chemical control has a problem of secondary pollution, and biological control or environmental control has a problem of high cost and much time and effort. In addition, physical control using an insect trap or the like has a problem in that device configuration is complicated, causing deterioration in ease of use, desired trapping efficacy cannot be secured, and device cost is relatively high.

UV light sources have been used for medical purposes such as sterilization, disinfection and the like, analytical purposes, such as analysis based on changes in radiated UV light, industrial purposes such as UV curing, cosmetic purposes such as UV tanning, and other purposes such as insect trapping, counterfeit money discrimination, and the like.

Examples of a typical UV lamp used as such UV light sources include mercury lamps, excimer lamps, and deuterium lamps. However, such typical UV lamps all have problems of high power consumption and heat generation, short lifespan, and environmental pollution due to toxic gas used in the lamps.

As an alternative to overcome the above-described problems of typical UV lamps, UV LEDs have attracted attention. UV LEDs are advantageous in that the UV LEDs have low power consumption and cause no environmental pollution. However, the production cost of LED packages that emit light in the UV range is considerably higher than the production cost of LED packages that emit light in the visible range, and various products using UV LED packages have not been developed since the characteristics of UV light are quite different from the characteristics of light in the visible range.

In addition, there are limits in replacement of typical UV lamps with UV LEDs due to difference in light-emission characteristics therebetween. A typical UV lamp provides surface emission and radiates light in all directions, whereas a UV LED provides spot emission and radiates light in one direction. Thus, depending upon application, it is necessary to take into account the difference between a UV lamp and a UV LED needs when replacing the UV lamp with the UV LED. For example, a UV light source used in an insect trap is configured to radiate UV light a full 360 degrees around the insect trap and thus needs to be designed to meet this requirement.

However, currently, typical UV lamps used in insect traps are not replaced with UV LEDs. The reason for this is that, when UV LEDs are used as a light source of an insect trap, it is necessary to consider not only a reason or principle for why insects are lured to UV light but also the preference for UV light and habits of such insects, unlike when the LEDs are used for analytical purposes, such as analysis based on changes in radiated UV light, industrial purposes such as UV curing, cosmetic purposes such as UV tanning, and other purposes such as counterfeit money discrimination.

Particularly, a cause or nature by which an insect is attracted to UV light varies depending on the species of the insect. Thus, a UV LED needs to be tuned such that UV light emitted therefrom can have properties suited to target insects.

A typical UV lamp used in an insect trap cannot be sufficiently powered by a rechargeable battery due to high power consumption thereof and thus requires a constant power source. Recently, with increasing camping population, there is increasing demand for insect traps to catch various insect pests that plague campers.

As described above, an insect trap using a typical UV lamp requires a constant power source and thus is difficult to use at campsites. In addition, such a typical UV lamp is difficult to use even at a campsite provided with a constant power source since the UV lamp radiates UV light in all directions in an uncontrolled manner, which can be harmful to campers. Particularly, staring at a UV lamp directly can cause deterioration in eyesight or cataracts, and exposing the skin to UV light can cause skin problems such as red spots.

Conversely, a UV LED can radiate UV light in a controlled manner and can be sufficiently powered by a rechargeable battery due to low power consumption thereof.

In the case of using an insect trap indoors, it is necessary to consider noise induced by the insect trap. Particularly, an insect trap that uses a fan to draw an insect attracted therearound into a capture container can make an unpleasant noise during operation of the fan. In addition, since the insect population is not high indoors unlike outdoors, unnecessary power consumption is increased when the fan is always operated.

DISCLOSURE

Technical Problem

The present invention have been conceived to overcome such a problem in the art and it is one aspect of the present invention to provide an insect trap which uses a UV LED, thereby exhibiting high insect trapping efficacy.

It is another aspect of the present invention to provide an insect trap which can provide surface light emission with a minimized number of UV LEDs, can radiate UV light toward a target region in a concentrated manner, and can radiate UV light in various ways.

It is a further aspect of the present invention to provide an insect trap which can be controlled in operation or can adjust a target UV-irradiated region according to the surrounding environment based on light emission characteristic of a UV LED.

It is yet another aspect of the present invention to provide a compact insect trap which can effectively dissipate heat generated by integrated UV LEDs.

It is yet another aspect of the present invention to provide an insect trap which can be powered by a rechargeable battery.

It is yet another aspect of the present invention to provide an insect trap which can minimize exposure of a user near the insect trap to UV light, thereby enhancing safety of the user.

It is yet another aspect of the present invention to provide an insect trap which allows a fan to be operated only when an insect is attracted around the insect trap to reduce noise due to operation of the fan and to minimize running time of the fan, thereby reducing power consumption.

Technical Solution

In accordance with one aspect of the present invention, there is provided a UV LED light source which is mounted on a side surface of an insect trap to radiate UV light in a horizontal direction, the UV LED light source including: a UV LED; a substrate on which the UV LED is mounted, the substrate being directly or indirectly secured to the insect trap; and a lens disposed in front of the UV LED, wherein a horizontal diffusion angle and vertical diffusion angle of the UV LED light source are adjusted through a geometric shape of the lens, the horizontal diffusion angle being greater than the vertical diffusion angle.

The UV LED light source may further include a reflective film between the substrate and the lens.

The lens may have a horizontal (X-X) sectional shape in which, at least in some sections, a distance r from a light emitting point of the UV LED to an outer surface E of the lens increases with increasing distance from a central axis of a light emitting region of the UV LED.

The lens may have a horizontal (X-X) sectional shape substantially the same as half of an ellipse divided along a major axis thereof.

The lens may include a recessed region in horizontal (X-X) sectional view, which is centered on the central axis of the light emitting region of the UV LED and extends from the central axis to a predetermined angle a1.

The recessed region may extend slantly outward from the central axis of the light emitting region of the UV LED, with slope gradually decreasing outward.

Total internal reflection may occur at at least part of the recessed region.

The lens may have a vertical (Y-Y) sectional shape in which a distance from the light emitting point of the UV LED to the outer surface of the lens decreases with increasing distance from the central axis of a light emitting region of the UV LED.

The lens may have a vertical (Y-Y) sectional shape substantially the same as half of an ellipse divided along a minor axis thereof.

The lens may have an elliptical shape with a horizontal (X-X) major axis and a vertical (Y-Y) minor axis in plan view parallel to the substrate.

The lens may be formed of quartz, PMMA (monomer content: 80% or more), or a fluorine-based synthetic resin.

A surface of the lens may be roughened.

The UV LED light source may emit light at a peak wavelength of 360 nm to 370 nm.

The UV LED light source may further include a sealing member-type lens between the UV LED and the lens.

An outer surface of the sealing member-type lens may adjoin an inner surface of the lens 23.

A portion of the lens facing the UV LED is formed with a light entering surface I formed to allow light emitted from the UV LED to enter the lens at a right angle to the light entering surface.

The light entering surface may have a hemispherical shape centered on the light emitting point of the UV LED.

In accordance with another aspect of the present invention, there is provided an insect trap including a UV LED mount having a plurality of UV LED light sources separately mounted at an outer periphery thereof and a trapping unit disposed adjacent to the UV LED mount, wherein center lines of UV emission regions of the UV LED light sources mounted on the UV LED mount are substantially radially arranged outward from the center of the insect trap.

A horizontal diffusion angle of light from the UV LED light source is greater than a vertical diffusion angle of light from the UV LED light source.

The outer periphery of the UV LED mount may have a circular or regular polygonal cross-sectional shape.

The outer periphery of the UV LED mount may have a partial circular or regular polygonal cross-sectional shape.

The outer periphery of the UV LED mount may include at least two inclined surfaces inclined in opposite directions.

The plurality of UV LED light sources may be controlled in light intensity or turned on/off individually or by group.

The plurality of UV LED light sources may be turned on/off by a rotary switch, wherein a plurality of contacts of the rotary switch may substantially correspond to the plurality of UV LED light sources.

The insect trap may further include a motion sensor, wherein any of the UV LED light sources radiating UV light toward a region in which motion of a person is detected by the motion sensor may be controlled to be turned off.

The insect trap may further include an illuminance sensor, wherein the UV LED light sources may be turned on/off or controlled in light intensity based on illuminance values measured by the illuminance sensor.

The illuminance sensor may measure both illuminance of visible light and illuminance of UV light, such that the UV LED light sources may be turned on/off or controlled in light intensity based on the measured illuminance values of visible light and UV light.

The plurality of UV LED light sources may flicker.

The UV LED mount may be rotatable about a vertical center axis thereof.

The trapping unit may include a fan such that the UV LED mount can be rotated by an air flow generated by the fan.

The UV LED mount may be formed of a material having high thermal conductivity.

The UV LED mount may be provided with a heat dissipation fin.

The heat dissipation fin may be disposed on a lower surface of the UV LED mount, and the trapping unit may include a fan, wherein the fan may be disposed under the UV LED mount.

The UV LED mount may have an inner hollow, the heat dissipation fin may extend inwardly from an inner surface of the UV LED mount, and the trapping unit may include a fan, wherein at least part of an air flow generated by the fan may flow through the inner hollow of the UV LED mount.

The heat dissipation fin may take the form of an induction wing rotatable by an air flow.

The trap unit may include a sticky trap member, wherein the sticky trap member may be detachably attached to at least one of an upper surface, lower surface, and outer periphery of the UV LED mount.

The insect trap may capture an insect attracted therearound by generating an air flow around the insect trap using the fan, wherein the fan may be operated when an insect is detected to be present around the insect trap.

The insect trap may further include a microphone, a filter filtering signals in a frequency band corresponding to sounds generated by an insect among sound signals collected by the microphone, an amplifier amplifying the filtered signals, and a comparator comparing values of the amplified signals with a reference value in order to detect presence of an insect around the insect trap.

The insect trap may further include: an infrared light emitting unit emitting infrared light toward a region in which an air flow is generated by the fan; and an infrared receiving unit receiving infrared light emitted from the infrared light emitting unit in order to detect presence of an insect around the insect trap.

The insect trap may further include: an ultrasonic wave generation unit radiating ultrasonic waves toward a region in which an air flow is generated by the fan; and an ultrasonic wave sensing unit disposed near the ultrasonic wave generation unit to detect returned ultrasonic waves.

In accordance with a further aspect of the present invention, there is provided an insect trap including: a trapping unit capturing an insect attracted by UV light; a UV LED mount disposed above the trapping unit to be separated therefrom; and a UV LED light source mounted on the UV LED mount and radiating UV light to attract an insect, wherein the UV LED light source includes a UV LED and a substrate on which the UV LED is mounted, is mounted on the UV LED mount with a central axis O of a light emission direction of the UV LED facing downward, and further includes a conversion unit disposed in front of the UV LED to redirect UV light from the UV LED sideways.

The conversion unit may include a lens redirecting UV light from the UV LED sideways.

The lens may include a total internal reflection surface extending slantly outward from the central axis O of the light emission direction of the UV LED with a slope gradually decreasing outwards, such that light components emitted from the UV LED at an angle smaller than a predetermined angle a with respect to the central axis of the light emission direction can be totally internally reflected by the total internal reflection surface to be redirected sideways.

The lens may further include a refraction surface extending outward from the total internal reflection surface to refract light components reflected by the total internal reflection surface and light components directly reaching the refraction surface without being reflected by the total internal reflection surface.

The conversion unit may further include a reflective film reflecting UV light emitted from the UV LED sideways.

The reflective film takes the form of a paraboloid centered on a light emitting point of the UV LED and allowing UV light reflected thereby to be radiated toward the outside of the UV LED mount.

The lens may extend predetermined degrees y around the center thereof to face the outside of the UV LED mount, and the conversion unit may include a reflective film formed predetermined degrees x at a position opposite the lens to reflect UV light from the UV LED sideways, wherein the light reflected by the reflective film may be radiated toward the outside through the lens.

The reflective film may be formed on a surface of the lens.

In accordance with yet another aspect of the present invention, there is provided a UV LED light source for an insect trap, including: a UV LED; a substrate on which the UV LED is mounted; and a lens disposed over the UV LED to redirect light from the UV LED sideways, wherein the lens is formed predetermined degrees around the center thereof and further includes a reflective film formed at a position opposite the lens to reflect UV light from the UV LED sideways, such that the light reflected by the reflective film is radiated sideways through the lens.

The lens may include a total internal reflection surface upwardly extending outward from a central axis O of a light emission direction of the UV LED with a slope gradually decreasing outwards, such that light components emitted from the UV LED at an angle smaller than a predetermined angle a with respect to the central axis of the light emission direction can be totally internally reflected by the total internal reflection surface to be redirected sideways.

The lens may further include a refraction surface extending outward from the total internal reflection surface to refract light components reflected by the total internal reflection surface and light components directly reaching the refraction surface without being reflected by the total internal reflection surface.

The reflective film may be formed on a surface of the lens.

The reflective film may take the form of a paraboloid centered on a light emitting point of the UV LED and allowing UV light reflected thereby to be radiated sideways.

In accordance with yet another aspect of the present invention, there is provided a radiation direction conversion unit for redirecting UV light from a UV LED sideways, the radiation direction conversion unit including: a receiving space in which the UV LED is placed; a lens redirecting UV light from the UV LED sideways; and a reflective film reflecting UV light from the UV LED sideways, wherein the light reflected by the reflective film is radiated sideways through the lens.

The lens may extend a predetermined angle y around a center thereof and the reflective film may be formed at a position opposite the lens.

The lens may include a total internal reflection surface upwardly extending outward from a central axis O of a light emission direction of the UV LED with a slope gradually decreasing outwards, such that light components emitted from the UV LED at an angle smaller than a predetermined angle a with respect to the central axis of the light emission direction can be totally internally reflected by the total internal reflection surface to be redirected sideways.

The lens may further include a refraction surface extending outward from the total internal reflection surface to refract light components reflected by the total internal reflection surface and light components directly reaching the refraction surface without being reflected by the total internal reflection surface.

The reflective film may be formed on a surface of the lens.

The reflective film may take the form of a paraboloid centered on a light emitting point of the UV LED and allowing UV light reflected thereby to be radiated sideways.

Advantageous Effects

The present invention provides an insect trap having high insect trapping efficacy.

The present invention provides an insect trap which can optimize operation of a UV light source in accordance with the surrounding environment while having a compact structure.

The present invention provides an insect trap which can suppress heat generation due to UV LEDs despite having a compact structure, thereby minimizing deterioration in performance of the UV LEDs.

The present invention provides an insect trap which can be operated without a constant power source and thus can be used in various applications.

The present invention provides an insect trap which can minimize generation of noise and reduce power consumption and thus can be operated in an efficient and eco-friendly manner.

The present invention provides an insect trap which allows easy placement and maintenance of UV LEDs while having a simple and compact structure.

The present invention provides an insect trap which can have high insect attraction efficacy without using a large number of UV LEDs, thereby exhibiting improved insect trapping efficiency.

The above and other aspects, features, and advantages of the present invention will become apparent from the detailed description of the following embodiments in conjunction with the accompanying drawings.

DESCRIPTION OF DRAWINGS

FIGS. 19A and 19B illustrate a principle of detection of mosquitoes using an optical sensor.

BEST MODE

Hereinafter, embodiments of the present invention will be described with reference to the accompanying drawings.

It should be understood that the present invention is not limited to the following embodiments and may be embodied in different ways, and that the embodiments are provided for complete disclosure and thorough understanding of the present invention by those skilled in the art.

First Embodiment 1000

Overall Configuration of Insect Trap

Figure 1:
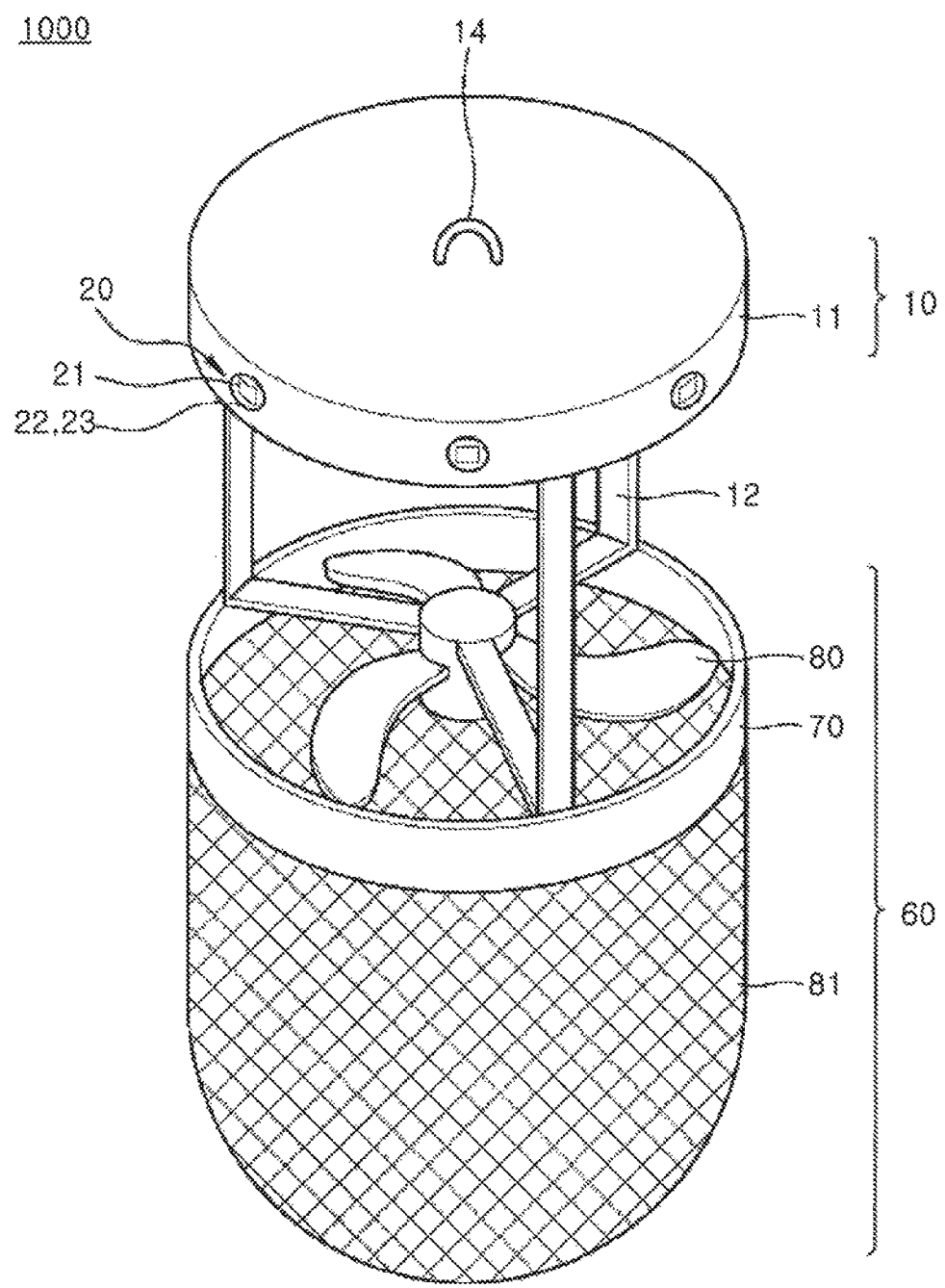
FIG. 1 is a perspective view of an insect trap according to one embodiment of the present invention.

FIG. 1 is a perspective view of an insect trap according to one embodiment of the present invention, and FIGS. 2A to 8B each shows a plan view and a front view of a UV LED mount of the insect trap of FIG. 1 according to any one of embodiments of the present invention.

Figure 2A:
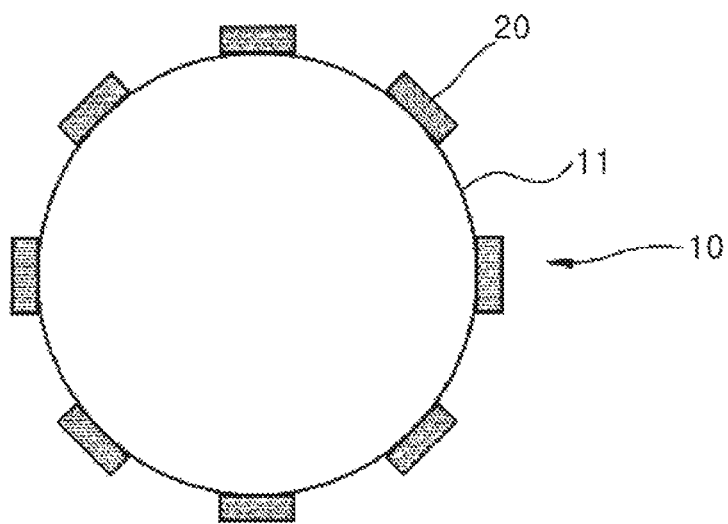
FIGS. 2A to 8B each shows a plan view and front view of a UV LED mount of the insect trap of FIG. 1 according to any one of embodiments of the present invention.
Figure 2B:
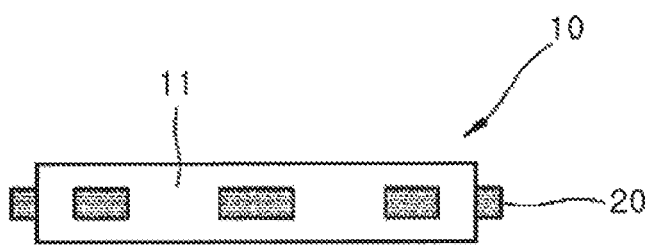

Referring to FIGS. 1 to 2B, the insect trap according to the present invention includes a UV LED mount 10 and a trapping unit 60.

The UV LED mount 10 includes a mounting surface 11 on which UV LED light sources 20 are mounted. The mounting surface 11 faces sideways such that the UV LED light sources 20 mounted on the mounting surface can radiate UV light sideways. In one embodiment, the mounting surface 11 may have a circular shape, as viewed from above, and the UV LED light sources 20 may be arranged at predetermined intervals on the mounting surface 11 to radiate UV light in all directions.

Each of the UV LED light sources 20 includes a UV LED 21 and lenses 22, 23 optically adjusting the diffusion angle and diffusion pattern of light emitted from the UV LED. The UV LED 21 may take the form of a device or chip, and the lenses may include a primary lens 22 optically adjusting UV light emitted from the UV LED and a secondary lens 23 readjusting UV light having been adjusted by the primary lens. The primary lens 22 may be integrally formed with the UV LED 21 to form a package.

The UV LED mount 10 is provided on an upper side thereof with a mounting loop 14 for hanging or suspending the insect trap. However, it should be understood that the present invention is not limited thereto and the position of the mounting loop 14 or an equivalent thereof may be varied, as needed.

The trapping unit 60 is disposed adjacent to the UV LED mount 10. Although the trapping unit is shown as disposed under the UV LED mount 10 in FIG. 1, it should be understood that the position of the trapping unit is not necessarily limited thereto. Although the trapping unit 60 using a fan 80 and a net 81 as shown in FIG. 1 is preferably disposed under the UV LED mount 10, it is desirable that a glue-type trapping unit (see FIGS. 15A and 15B) or an electric shock trapping unit be disposed at a position where trapping efficacy of the trapping unit can be maximized.

Referring to FIG. 1, the trapping unit includes the fan 80 and the net 81. In addition, the trapping unit further includes a housing 70 defining a specific space and a connection 12 connecting the trapping unit 60 or the housing 70 to the UV LED mount 10. Further, the connection 12 serves to allow the housing 70 to be separated by a predetermined distance from the UV LED mount 10. The fan 80 is disposed inside the housing 70 to draw in air from a space between the UV LED mount 10 and the housing 70 and forcibly discharge the air downward.

The net 81 is disposed under the housing 70 to entrap insects. The net 81 is detachably coupled to the housing 70 to empty the net 81 filled with trapped insects. As air forced to flow downward by the fan 80 exits through the net 81, an insect lured to UV light from the LED light source 20 and flying to the vicinity of the space between the UV LED mount 10 and the housing 70 is drawn into the air flow to be trapped in the net 81.

Although the fan 80 may be in operation always, it should be understood that the fan may be operated only when an insect is attracted to UV light and flies around the insect trap, which will be described below.

Although the UV LED mount 10 is shown as having a similar cross-sectional area to the housing 70 in FIG. 1, it should be understood that the present invention is not limited thereto and the UV LED mount 10 may have a larger or smaller cross-sectional area than the housing 70.

FIGS. 2A and 2B show a UV LED mount 10 according to another embodiment of the present invention. Referring to FIGS. 2A and 2B, the UV LED mount 10 has a disk shape, wherein a mounting surface 11 of the UV LED mount is a peripheral surface of the disk-shaped UV LED mount. A plurality of UV LED light sources 20 is arranged at equidistant intervals on the mounting surface 11, such that UV light can be radiated a full 360 degrees in all directions. Although eight UV LED light sources 20 are shown in FIGS. 2A and 2B, it should be understood that the number of UV LED light sources may vary depending upon the intensity and diffusion angle of UV light emitted from the UV LED light source.

Figure 3A:
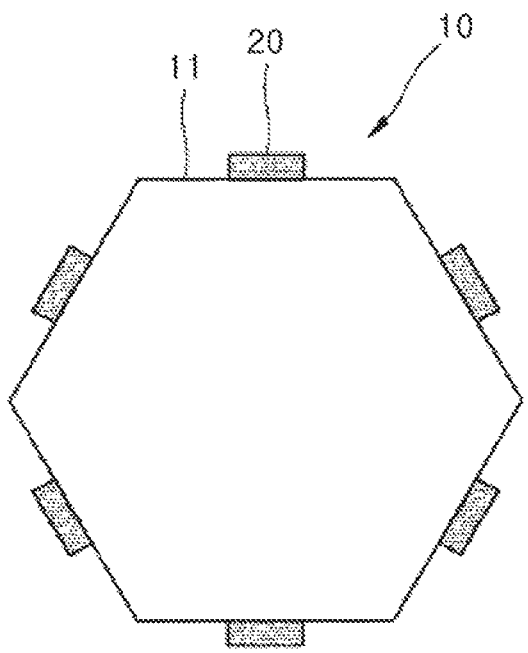
Figure 3B:
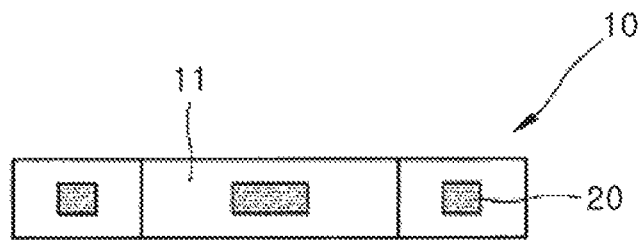

FIGS. 3A and 3B show a UV LED mount 10 according to a further embodiment of the present invention. Referring to FIGS. 3A and 3B, the UV LED mount 10 has a regular hexagonal shape, wherein a mounting surface 11 of the UV LED mount is a peripheral surface of the regular hexagonal UV LED mount. Although one UV LED light source 20 is disposed on each side of the regular hexagonal UV LED mount, two or more UV LED light sources 20 may be disposed on each side of the regular hexagonal UV LED mount, as needed. In this embodiment, UV light can be radiated a full 360 degrees in all directions.

Figure 4A:
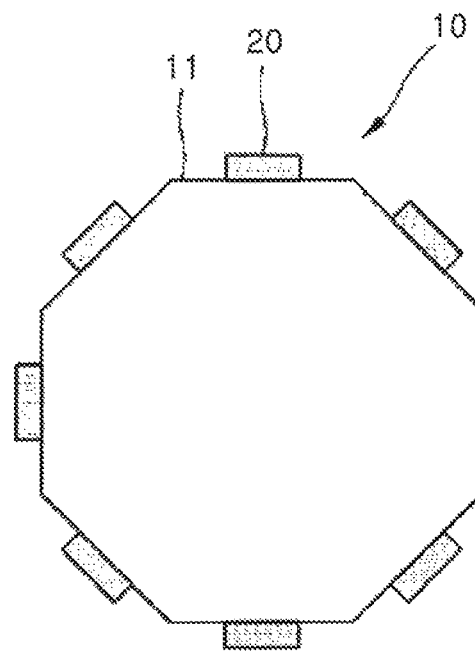
Figure 4B:
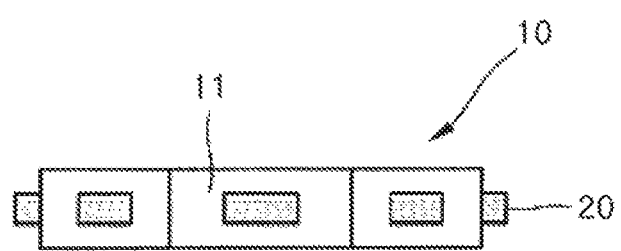

FIGS. 4A and 4B show a UV LED mount 10 according to yet another embodiment of the present invention. Referring to FIGS. 4A and 4B, the UV LED mount 10 has a regular octagonal shape, wherein a mounting surface 11 of the UV LED mount is a peripheral surface of the regular octagonal UV LED mount. Although one UV LED light source 20 is disposed on each side of the regular octagonal UV LED mount, two or more UV LED light sources 20 may be disposed on each side of the regular octagonal UV LED mount, as needed. In this embodiment, UV light can be radiated a full 360 degrees in all directions.

Each of the regular polygonal UV LED mounts shown in FIGS. 3A to 4B is advantageous for mounting a substrate with the UV LED light source 20 mounted thereon since the mounting surface of each of the UV LED mounts is flat.

Figure 5A:
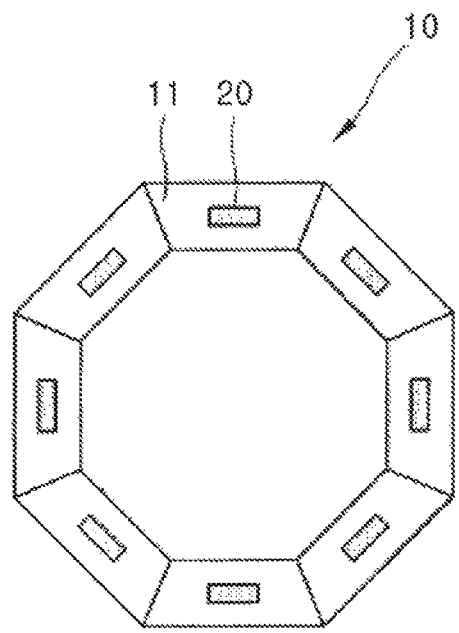
Figure 5B:
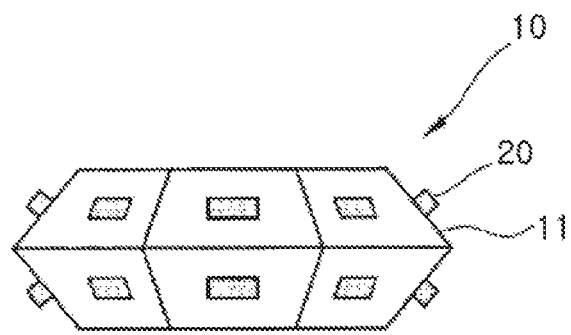

FIGS. 5A and 5B show a UV LED mount 10 according to yet another embodiment of the present invention. Referring to FIGS. 5A and 5B, the UV LED mount 10 has a regular octagonal shape, wherein a mounting surface 11 of the UV LED mount includes upper and lower inclined peripheral surfaces of the regular octagonal UV LED mount. Although one UV LED light source 20 is disposed on each side of the upper and lower inclined peripheral surfaces of the regular octagonal UV LED mount, two or more UV LED light sources 20 may be disposed on each side of the upper and lower inclined peripheral surfaces of the regular octagonal UV LED mount, as needed. In this embodiment, UV light can be radiated a full 360 degrees in all directions.

Although the upper inclined peripheral surface of the UV LED mount 10 is inwardly inclined toward the top and the lower inclined peripheral surface is inwardly inclined toward the bottom in FIGS. 5A and 5B, it should be understood that the present invention is not limited thereto. For example, the upper inclined peripheral surface may be inwardly inclined toward the bottom and the lower inclined peripheral surface may be inwardly inclined toward the top. As another alternative, a vertical peripheral surface may be further formed between the upper inclined peripheral surface and the lower inclined peripheral surface. In addition, it should be understood that at least one UV LED light source 20 is not necessarily disposed on each side of the upper inclined peripheral surface, the lower inclined peripheral surface, and the vertical peripheral surface.

Figure 6A:
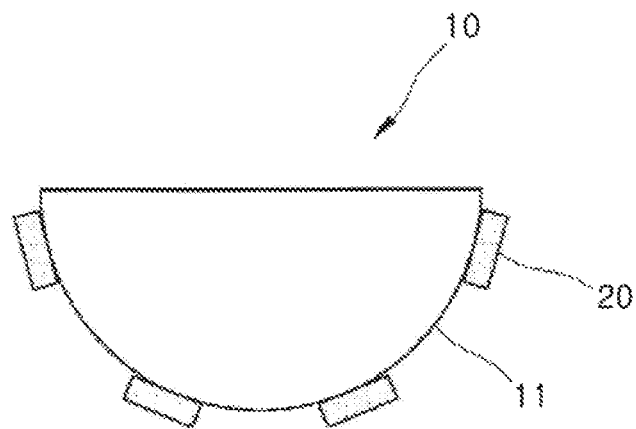
Figure 6B:
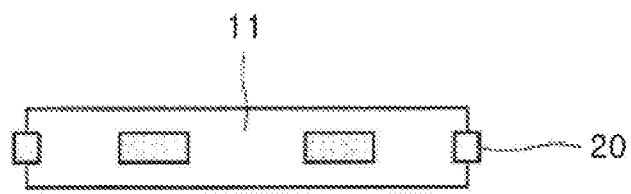

FIGS. 6A and 6B show a UV LED mount 10 according to yet another embodiment of the present invention. Referring to FIGS. 6A and 6B, the UV LED mount 10 has a semi-disk shape, wherein a mounting surface 11 of the UV LED mount is a peripheral surface of the semi-disk-shaped UV LED mount. A plurality of UV LED light sources 20 is arranged at equidistant intervals on the mounting surface 11 to radiate UV light a full 180 degrees. Although four UV LED light sources 20 are arranged in FIGS. 6A and 6B, the number of UV LED light sources may vary depending upon the intensity and diffusion angle of light emitted from the UV LED light source.

The UV LED mount 10 of FIGS. 6A and 6B may be used to mount the insect trap on a wall. When the insect trap needs to be mounted at a corner where two perpendicular wall surfaces meet, a UV LED mount having a quarter-disk shape may be used.

Figure 7A:
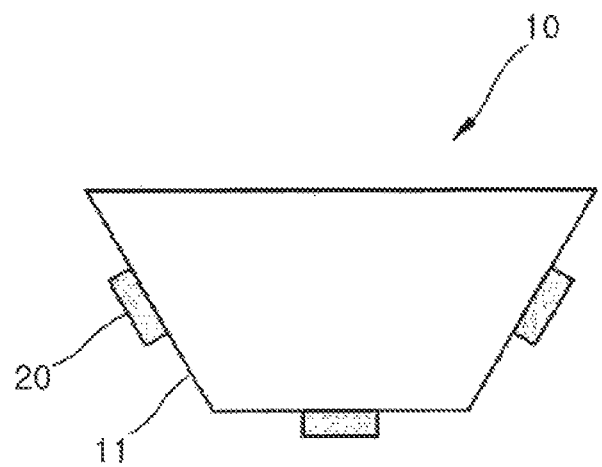
Figure 7B:
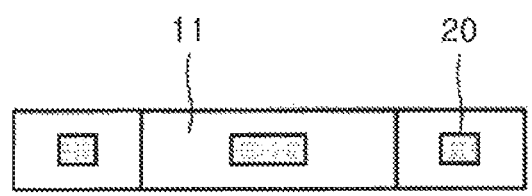
Figure 8A:
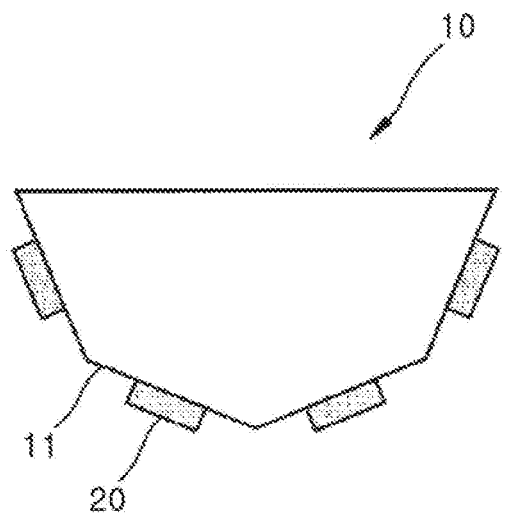
Figure 8B:
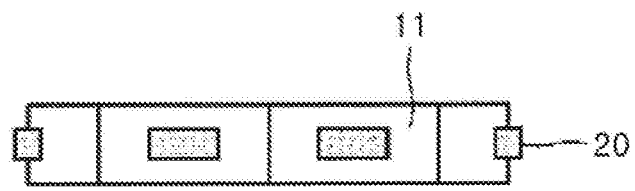

FIGS. 7A and 7B show a UV LED mount corresponding to half of the regular hexagonal UV LED mount of FIGS. 3A and 3B, wherein one UV LED light source 20 is mounted on each of three sides of a flat mounting surface. FIGS. 8A and 8B show a UV LED mount corresponding to half of the regular octagonal UV LED mount of FIGS. 4A and 4B, wherein one UV LED light source 20 is mounted on each of four sides of a flat mounting surface. Although not shown, there may be provided a UV LED mount corresponding to half of each of UV LED mounts described with reference to FIGS. 5A and 5B. In addition, there may be provided a UV LED mount corresponding to, for example, ⅓ or ¼ of each of the UV LED mounts described with reference to FIGS. 5A and 5B depending upon the position or environment where the UV LED mount is placed. It should be noted that such a segment-type UV LED mount has higher light source utilization efficiency than a typical surface-emitting UV lamp that radiates UV light in all directions.

An insect trap using a typical UV lamp requires a high capacity battery since the UV light lamp and a fan sized corresponding to the UV lamp both use a large amount of power. However, use of such a large and heavy high capacity battery can cause deterioration in portability.

Conversely, the insect trap using a UV LED according to the present invention can considerably reduce overall power consumption since the UV LED has a power consumption reduced by 60% or more, as compared with a typical UV lamp and a fan can be small in size. Thus, the insect trap can be operated for 12 hours or more even with a small battery, which greatly expands the application area of the insect trap. Particularly, the insect trap using the UV LED is portable and is easy to use at a camping site.

Operation of UV LED Light Source

In FIGS. 1 to 8B, the configuration of the insect trap and the shape of the UV LED mount 10 have been described. Now, operation of the UV LED light source 20 mounted on the UV LED mount 10 will be described.

Figure 10A:
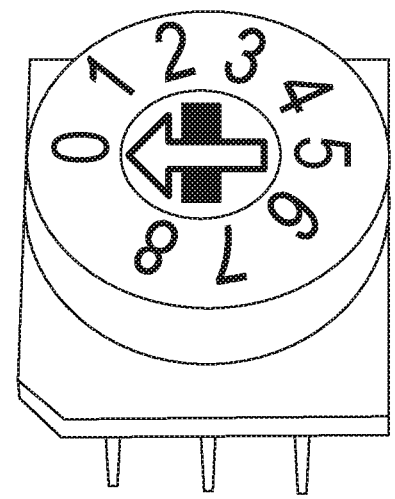
FIGS. 10A and 10B are views of a rotary switch individually turning on/off the UV LED light sources of the insect trap.
Figure 10B:
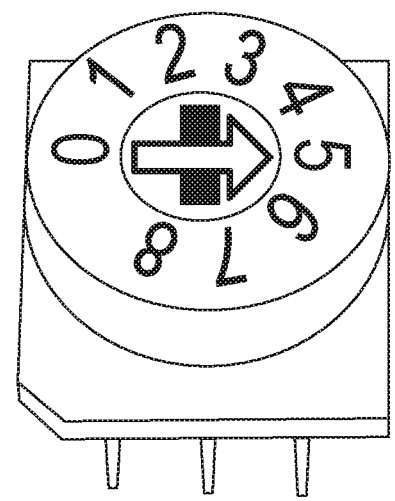

Most simply, all UV LED light sources 20 mounted on the UV LED mount 10 may be simultaneously turned on or off by a single switch. Alternatively, this manual on/off control may be applied to each UV LED light source 20. For example, one switch may be provided for each UV LED light source 20, or one switch may be provided for each group of UV LED light sources 20 disposed on one flat mounting surface (see FIGS. 3A to 8B). As the switch, a rotary switch as shown in FIGS. 10A and 10B may be used. For example, when the rotary switch is set to "0", as shown in FIG. 10A, all UV LED light sources 20 may be turned on, and, when the rotary switch is set to "5", as shown in FIG. 10B, UV LED light sources 20 adjacent to portion ⑤ may be turned off and the other UV LED light sources 20 may be turned on.

Figure 9A:
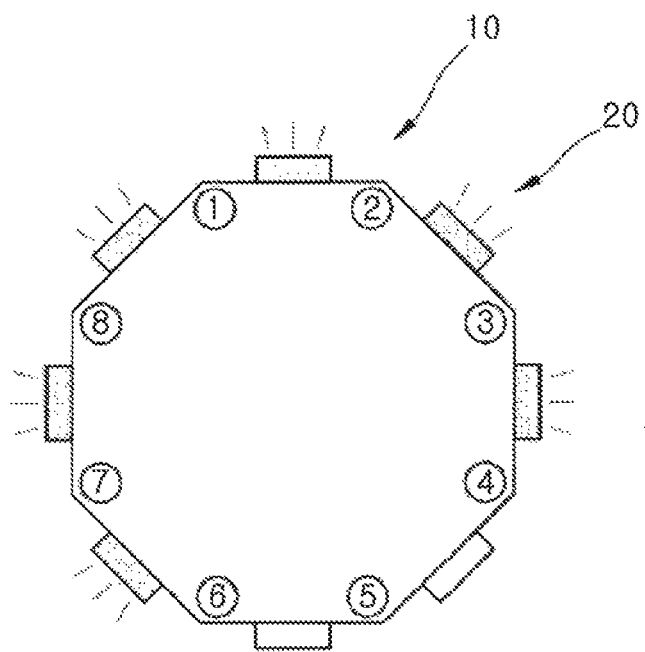
FIGS. 9A and 9B are views of UV LED light sources of the insect trap individually turned on or off.
Figure 9B:
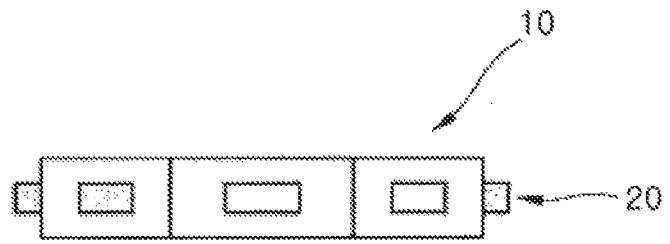
Figure 11:
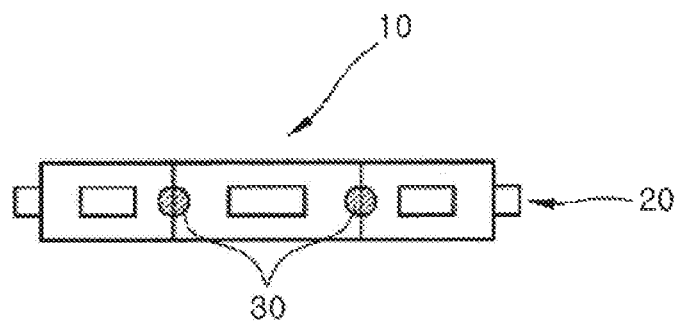
FIG. 11 is a view of a motion sensor placed around the UV LED light sources of the insect trap.

In addition, a motion sensor 30 may be disposed to detect the motion of a person in a region irradiated with UV light, as shown in FIG. 11. When the motion of a person is detected in the region, a corresponding UV LED light source 20 may be turned off. The motion sensor may be disposed between a pair of adjacent UV LED light sources 20, as shown in FIG. 11. Alternatively, the motion sensor may be disposed on an upper or lower side of the UV LED light source 20. In other words, the motion sensor 30 may be placed at any position allowing the motion sensor to detect the motion of a person in each direction. As the motion sensor, an ultrasonic sensor or an infrared sensor may be used. Generally, UV light in the UVA region, which is not particularly harmful to the human body, is mainly used to lure insects into the insect trap. However, long-term exposure of the skin to UV light can cause erythema, and continuous observation of a UV light source can cause amblyopia or cataracts. According to the present invention, on/off of the UV LED light source 20 may be controlled such that UV light is not radiated toward a region in which the motion of a person is detected by the motion sensor 30. Referring to FIG. 9A, which shows UV LED light sources individually turned on or off, when the motion of a person is detected in the direction ⑤, a UV LED light source 20 radiating UV light in the 6 o'clock direction and a UV LED light source 20 radiating UV light in the 4:30 direction may both be turned off. In this way, a UV LED light source radiating UV light in a direction in which the motion of a person is detected or in a direction adjacent thereto may be turned off, whereby direct and continuous exposure of the human to UV light can be minimized.

In addition, an illuminance sensor may be further disposed such that the UV LED light source 20 is automatically turned on or off. The illuminance sensor may include a sensor measuring illuminance of visible light and/or a sensor measuring illuminance of UV light. On/off control of the UV LED light source using the sensors may be implemented in various ways.

For example, during the daytime when mosquitoes are less active and, due to high UV index, UV light emitted from the UV LED light source 20 is canceled out by UV light from the sun and is thus ineffective in attracting mosquitoes, the insect trap may be turned off by shutting off power supply to the UV LED light source 20 when both the illuminance of visible light and the illuminance of UV light exceed a predetermined level. Alternatively, the intensity of UV light emitted from the UV LED light source 20 may be increased above the intensity of natural UV light measured by the illuminance sensor, such that insects can be attracted to UV light from the UV LED light source. In other words, according to the present invention, operation of the insect trap can be automatically controlled in various environments using both the illuminance sensor for visible light and the illuminance sensor for UV light.

Figure 12A:
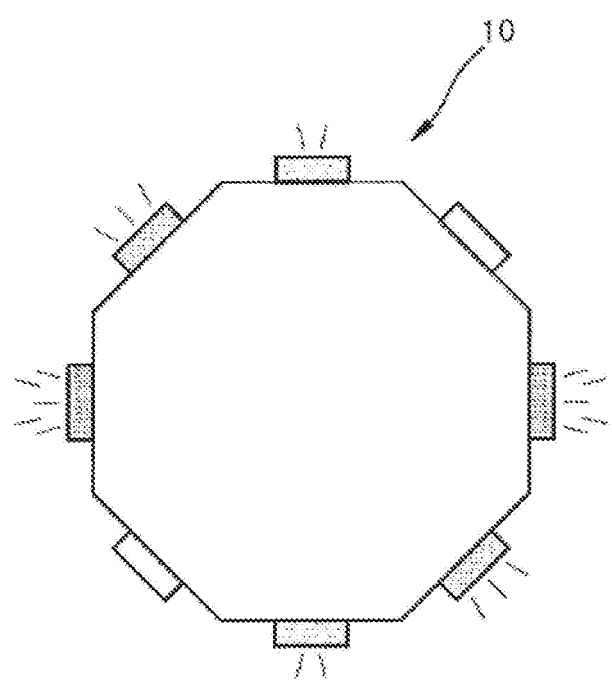
FIGS. 12A and 12B are views of flickering UV LED light sources of the insect trap.
Figure 12B:
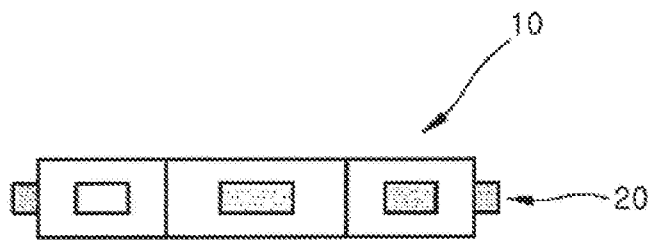

Although some insects are more attracted to steady UV light, some insects are more attracted to blinking or flickering UV light depending upon the nature thereof. According to the present invention, all the UV LED light sources may be controlled to flicker simultaneously. FIGS. 12A and 12B show flickering of UV LED light sources of the insect trap according to the present invention. Referring to FIGS. 12A and 12B, the UV LED light sources arranged along the periphery of the UV LED mount 10 may also be configured to flicker sequentially rather than simultaneously. Here, each of the UV LED light sources may be turned on or off gradually rather than instantly. Unlike a typical UV lamp, a UV LED can be easily and efficiently controlled to flicker in this manner.

Figure 13A:
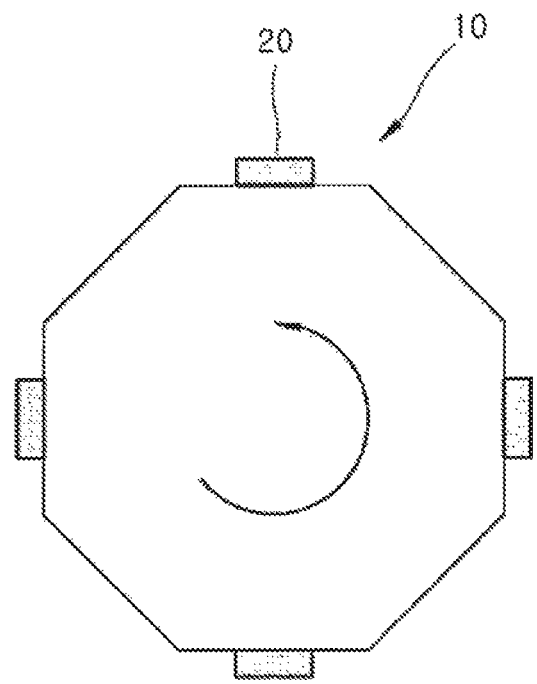
FIGS. 13A and 13B are views of flickering UV light implemented through rotation of the UV LED mount.
Figure 13B:
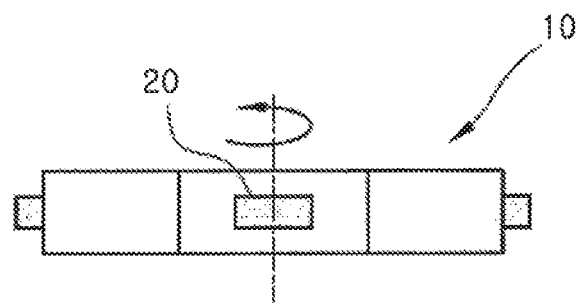

FIGS. 13A and 13B show a state in which the UV LED mount is rotated to provide flickering UV light. Referring to FIGS. 13A and 13B, the flickering effect may be realized by rotating the UV LED mount 10 with UV LED light sources 20 intermittently mounted thereon without individually controlling the UV LED light source 20 to flicker. Here, the rotation speed of the UV LED mount may vary depending on a desired flickering rate. Such a method of realizing the flickering effect through rotation of the UV LED mount can minimize the required number of UV LED light sources 20. Although the UV LED mount 10 may be rotated using a separate power source, the rotational power of the fan 80 shown in FIG. 1 may be utilized to rotate the UV LED mount 10. For example, the UV LED mount 10 may be rotated by receiving the rotational power of the fan through a mechanical mechanism, or by receiving the force of air flow generated by the fan.

Compact Portable Structure

Since the UV LED light source 20 consumes less power and is significantly smaller in size than a typical UV lamp, the insect trap using the UV LED light source 20 can be smaller than a typical insect trap. In addition, the insect trap according to the present invention may be powered by a battery rather than an external power source or a constant power source due to low power consumption thereof. Particularly, the compact and portable insect trap according to the present invention is useful in places where an external power source is not available while mosquitoes or insect pests are prevalent, such as camping sites.

When the UV LED light sources 20 are densely mounted on the small UV LED mount 10, luminous efficacy of the UV LED light sources can be deteriorated due to heat generation. In order to overcome such a problem, the UV LED mount 10 according to the present invention preferably includes a material having a high thermal conductivity and is provided with heat dissipation fins 16.

Figure 14A:
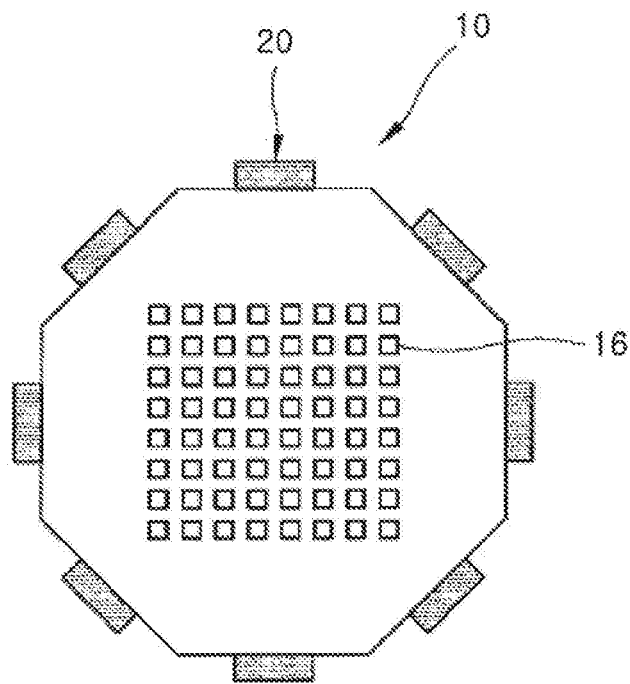
FIGS. 14A to 15B are views of a heat dissipation fin disposed on the UV LED mount according to the present invention.
Figure 14B:
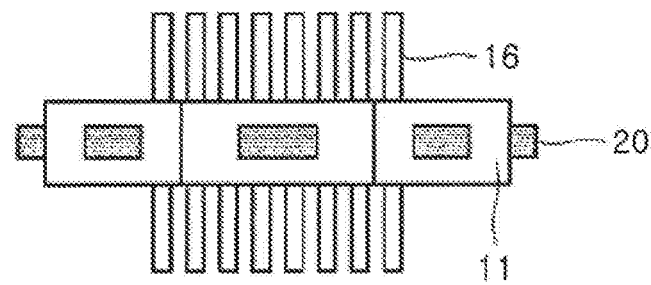

FIGS. 14A to 15B are views of heat dissipation fins provided to the UV LED mount according to the present invention. Referring to FIGS. 14A and 14B, the heat dissipation fins 16 may be arranged on at least one of upper and lower sides of the UV LED mount 10. Since heat is radiated upward, when the heat dissipation fins 16 are arranged on the upper side of the UV LED mount 10, it is possible to obtain high heat dissipation efficiency. For the insect trap of FIG. 1 in which an air flow is generated by the fan 80 disposed under the UV LED mount 10 as shown in FIG. 1, the heat dissipation fins 16 are preferably arranged on the lower side of the UV LED mount 10 to provide high heat dissipation efficiency. However, it should be understood that the present invention is not limited thereto and the heat dissipation fins 16 may be disposed at any suitable position.

Figure 15A:
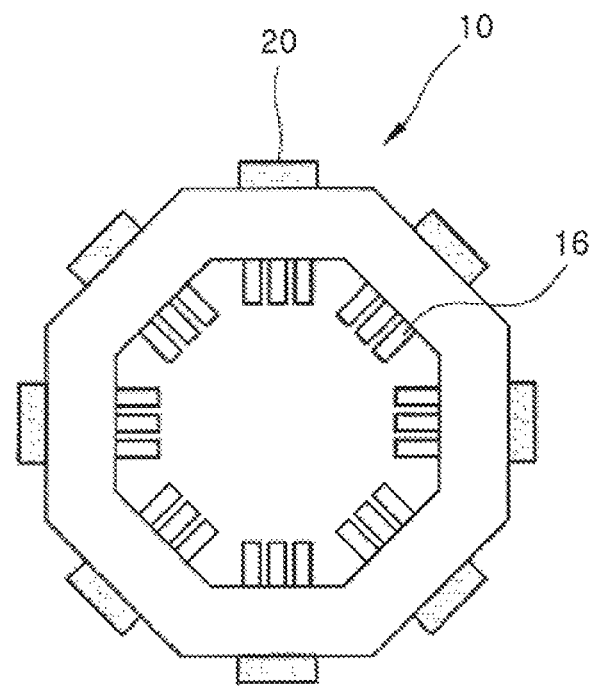
Figure 15B:
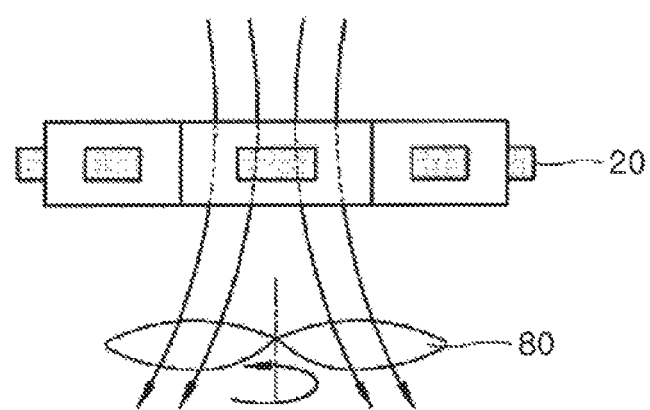

Referring to FIGS. 15A and 15B, the UV LED mount 10 may have an annular shape and the heat dissipation fins 16 may be arranged to extend inward from an inner peripheral portion of the UV LED mount. Particularly, this arrangement of the heat dissipation fins is particularly suitable for the insect trap in which an air flow is generated by the fan 80 disposed under the UV LED mount 10, as shown in FIG. 15B.

Figure 16:
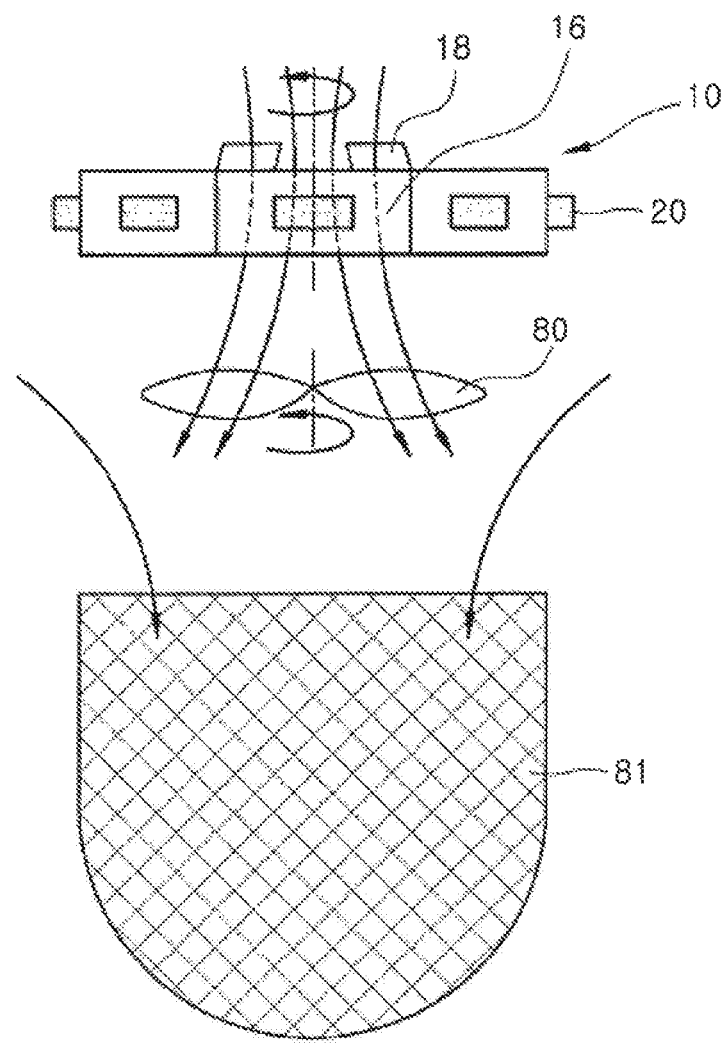
FIG. 16 is a view of an induction wing disposed on the UV LED mount of FIG.

In addition, an induction wing 18 may be disposed at the inner peripheral portion of the annular UV LED mount, as shown in FIG. 16, such that the UV LED mount 10 can be rotated by rotational force caused by kinetic energy of the air flow generated by the fan 80, as described above with reference to FIGS. 13A and 13B, while being cooled by the heat dissipation fins 16. As a result, the required number of UV LED light sources 20 disposed at an outer peripheral portion of the UV LED mount 10 can be reduced while producing an effect similar to flickering of the UV LED light source 20. Alternatively, the heat dissipation fin 16 may be fabricated in the form of the induction wing 18 to integrate the two components into one.

Figure 17:
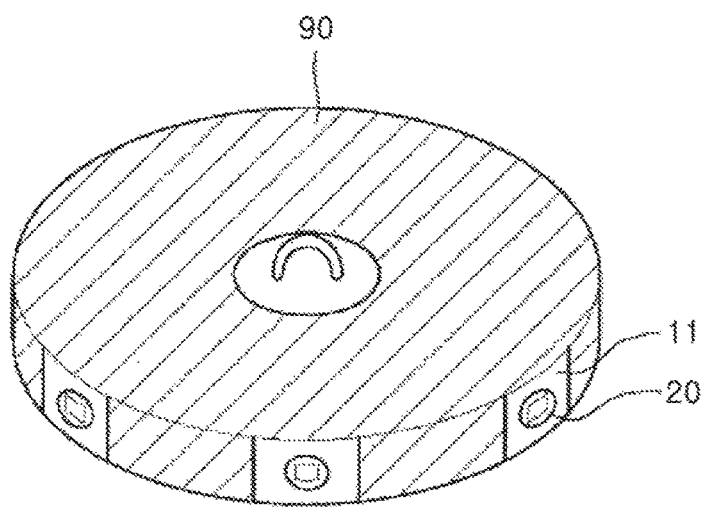
FIG. 17 is a perspective view of an insect trap according to another embodiment of the present invention.

In order to make the insect trap more compact and to further reduce power consumption, the trapping unit may be composed of a sticky trap member 90 without the housing 70, the fan 80 and the net 81, as shown in FIG. 17. The sticky trap member may be disposed at predetermined positions on an upper surface, lower surface, and periphery of the UV LED mount 10 to catch an insect lured thereinto by the UV LED light source 20. In addition, the sticky trap member may take the form of a double-sided tape instantly attachable to the upper, lower, and side surfaces of the UV LED mount 10 at a camping site. Preferably, a surface of the sticky trap member bonded to the UV LED mount 10 has lower adhesive force and the other surface of the sticky trap member configured to catch insects has higher adhesive force, such that the sticky trap member 90 can be easily replaced after use.

Operation of Fan

In the embodiments shown in FIGS. 1, 15A, 15B, and 16, the insect trap is configured in such a way that an insect attracted to UV light is trapped in the net 81 by the fan 80. Although the fan 80 may be continuously rotated during operation of the insect trap, it is inefficient to operate the fan when there is no attracted insect around the insect trap. According to the present invention, the fan 80 may be operated only when attracted insects are present around the insect trap.

In other words, the fan 80 can be operated more efficiently by operating the fan 80 when insects are detected to be attracted around the insect trap. For example, presence of insects around the insect trap may be detected based on sounds made by the insects.

Figure 18:
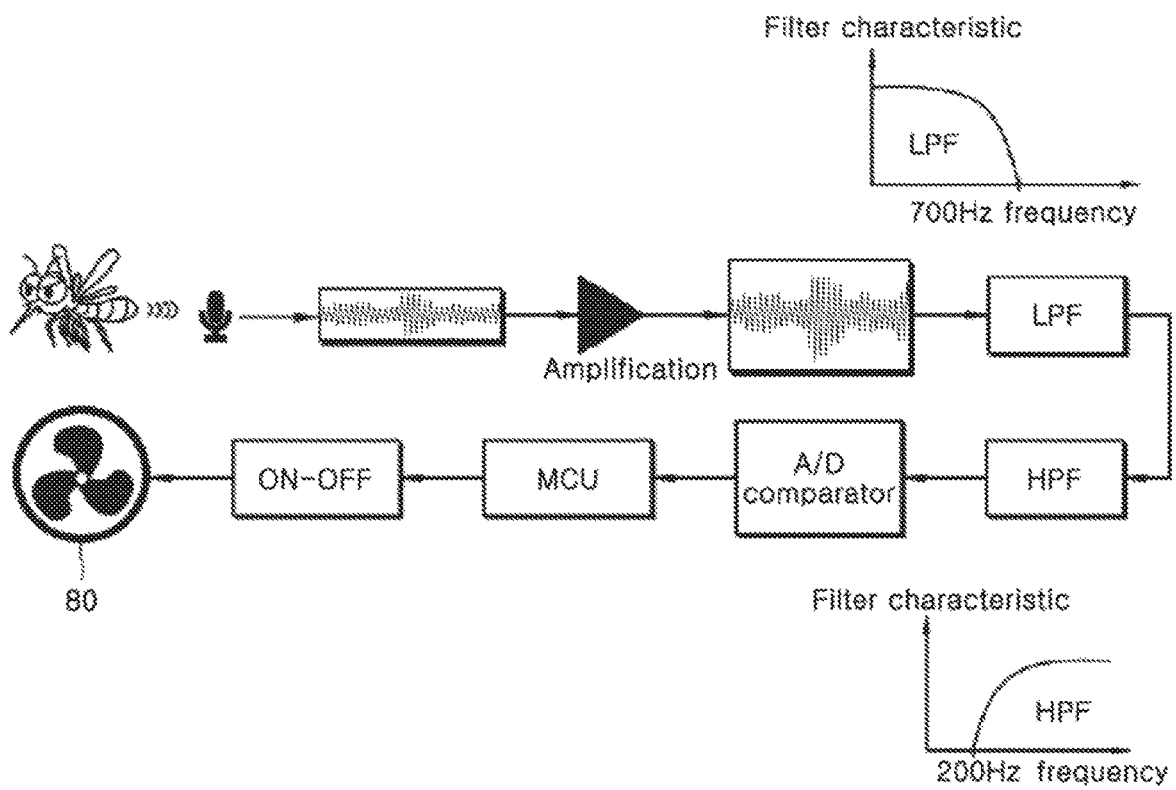
FIG. 18 is a flow diagram of a process of detecting approach of mosquitoes around the insect trap.

FIG. 18 is a flow diagram of a process of detecting the approach of mosquitoes. For example, a mosquito beats its wings about 200 to 700 times per second, making a slight noise. Accordingly, a microphone may be provided to the insect trap to collect sound signals around the insect trap and to amplify the collected signals. Here, signals above 700 Hz may be discarded (using a low-pass filter) and signals below 200 Hz may be blocked (using a high-pass filter). Then, the value of remaining amplified signals, corresponding to the sound of wings of a mosquito, is compared with a reference value, thereby determining whether a mosquito is present around the insect trap. When it is determined that the value of the remaining amplified signals is greater than the reference value and thus a mosquito is present around the insect trap by an A/D comparator and a controller (MCU), the fan 80 is operated to force the mosquito to be trapped in the net 81.

In another embodiment, an optical sensor may be used to detect the approach of mosquitoes. FIGS. 19A and 19B illustrate a principle of detection of mosquitoes using an optical sensor. Referring to FIGS. 19A and 19B, an infrared light emitting unit 41 may be placed at one side of a space in which mosquitoes are attracted by the UV LED light source 20 and an array of infrared receiving units 42 may be placed at the other side of the space. When there is no mosquito in the space, as shown in FIG. 19A, there is no difference in sensor output between the plurality of infrared receiving units, whereas, when there is a mosquito in the space, there is a difference in sensor output between at least some of the plurality of infrared receiving units. When the sensor outputs of some of the infrared receiving units are reduced due to interference caused by an insect such as a mosquito between the infrared light emitting unit 41 and the infrared receiving units 42, it is determined that an insect such as a mosquito is present around the insect trap, followed by operation of the fan 80.

Figure 20:
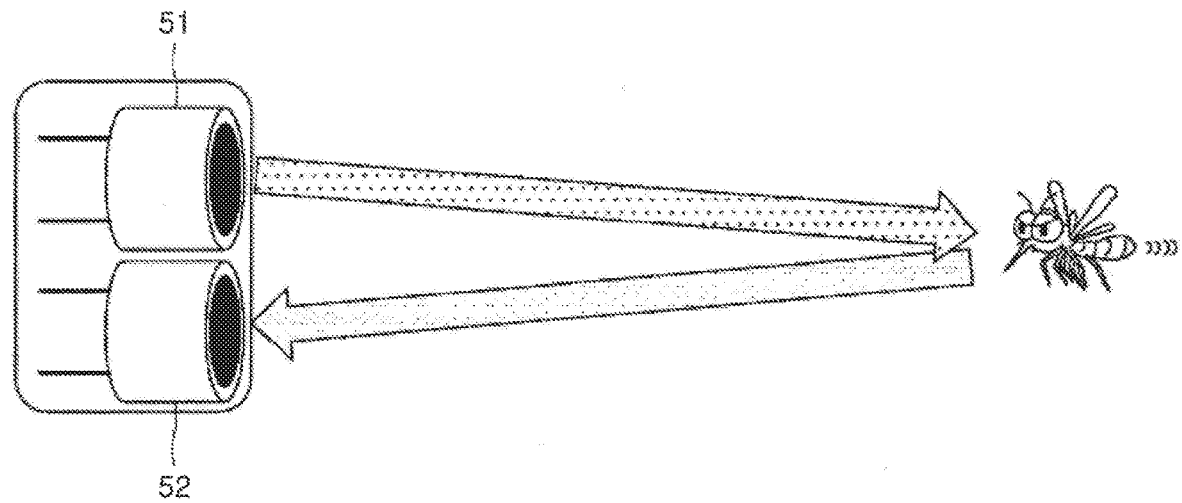
FIG. 20 illustrates a principle of detection of mosquitoes using an ultrasonic sensor.

In a further embodiment, an ultrasonic sensor may be used to detect the approach of mosquitoes. FIG. 20 illustrates a principle of detection of mosquitoes using an ultrasonic sensor. Referring to FIG. 20, an ultrasonic wave generation unit 51 and a sensing unit 52 may be disposed near the UV LED light source such that it is determined that an insect is attracted around the insect trap when the sensing unit detects sound waves generated by the ultrasonic wave generation unit and then returned after striking a mosquito or the like, followed by operating the fan 80. Preferably, the intensity of the ultrasonic waves is set as low as possible not to alarm insects.

In this way, the running time of the fan can be minimized, thereby minimizing noise generated by the fan while reducing power consumption required for operation of the fan.

UV LED Light Source of Insect Trap

Figure 21:
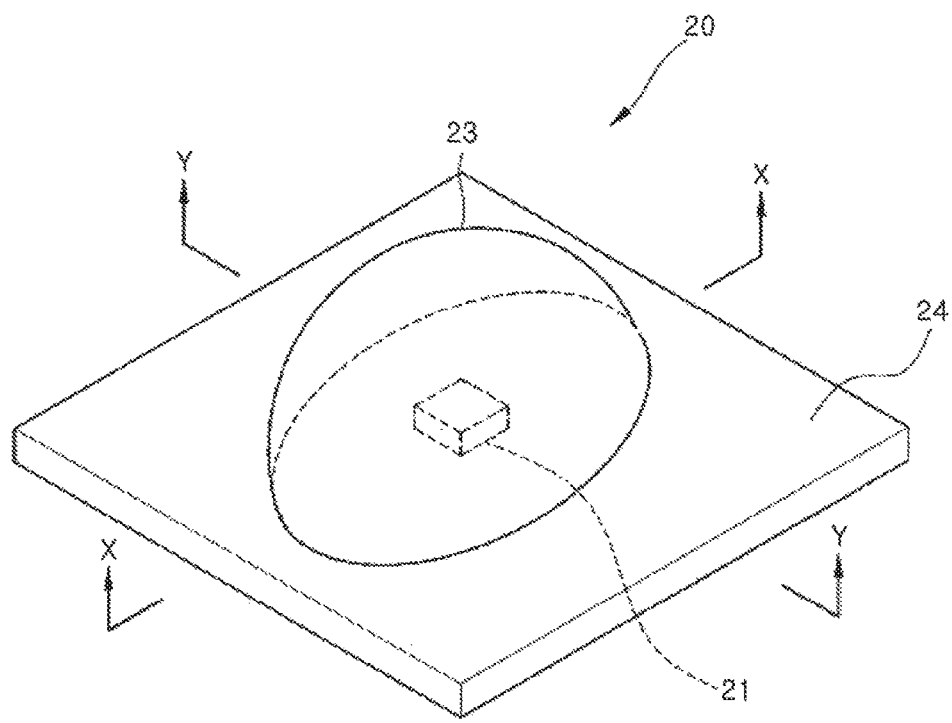
FIG. 21 is a perspective view of one embodiment of the UV LED light source used in the insect trap according to the present invention.
Figure 22:
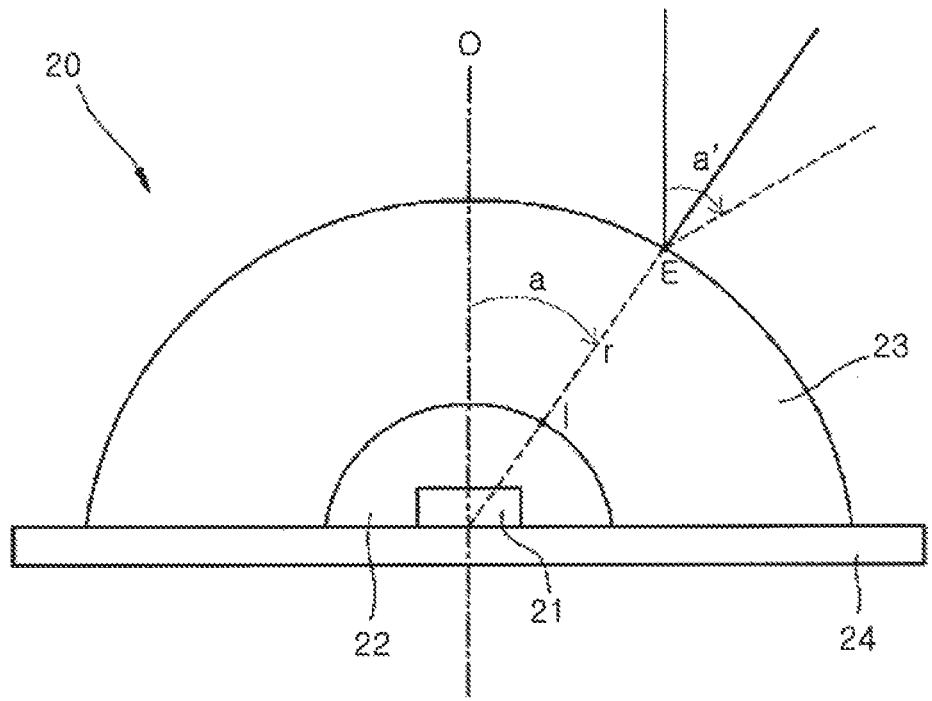
FIG. 22 is a sectional view taken along line X-X of FIG. 21.
Figure 23:
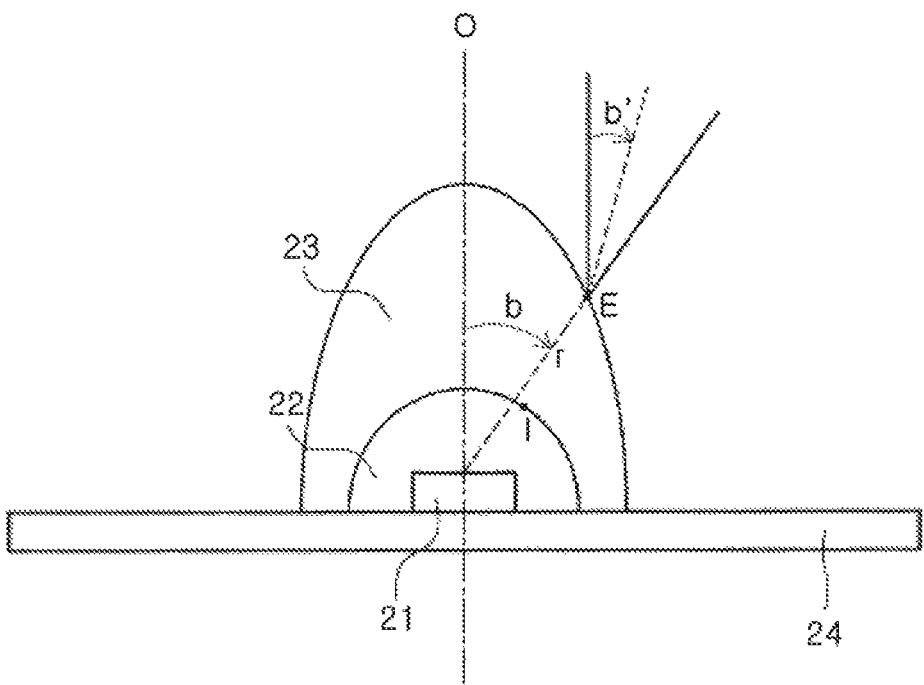
FIG. 23 is a sectional view taken along line Y-Y of FIG. 21.

FIG. 21 is a perspective view of one embodiment of the UV LED light source used in the insect trap according to the present invention, FIG. 22 is a sectional view taken along line X-X of FIG. 21, and FIG. 23 is a sectional view taken along line Y-Y of FIG. 21.

Generally, an insect trap is placed at a position higher than a person's height, which is unlikely to be reached or noticed by a person. As described above, the insect trap according to the present invention is provided on the side surface thereof with a UV LED light source radiating UV light sideways. Generally, insects are visually stimulated and attracted by UV light in the UVA region. Although UV light in the UVA region does not actually have significant influence on the human body, people's perception of UV light is generally negative. In addition, it is more advantageous that radiation of UV light is concentrated in a region near the height where an UV LED is placed such that UV light can be radiated farther, rather than being diffused toward a region in which people are mainly working. Further, it is preferable that UV light is evenly radiated in the irradiated region rather than being concentrated at a certain portion in the irradiated region.

Referring to FIG. 21, the UV LED light source 20 according to the present invention includes a UV LED 21 mounted on a substrate 24 and a lens integrally or separately formed on the substrate to cover the UV LED 21. The lens of the UV LED light source according to the present invention controls an optical path such that UV light from the UV LED 21 can be radiated in a concentrated manner in a vertical direction and in a diffuse manner in a lateral direction, whereby radiation of UV light can be concentrated in the region near the height where the UV LED is placed, as described above. In FIG. 21, the X-X direction corresponds to the lateral direction and the Y-Y direction corresponds to the vertical direction when the UV LED light source is mounted on the insect trap.

Referring to FIG. 22, when an angle of an optical path of light from the UV LED 21 with respect to a central axis O of a light emission region of the UV LED 21 is a, a surface profile of a secondary lens 23 is formed such that the distance r from a light emitting point of the UV LED 21 to a light exiting point E of a surface of the secondary lens 23 gradually increases as a increases. According to this profile, the angle of the optical path changes from a to a' (a<a') when UV light from the UV LED 21 is refracted through the surface of the secondary lens 23. Thus, a diffusion angle of UV light from the UV LED 12 is laterally widened by the secondary lens 23. As a result, UV light emitted from the UV LED 21, which is a spot light source, is converted into surface light to some extent. In FIG. 22, the secondary lens has a cross-sectional shape similar to an ellipse divided along the major axis.

Referring to FIG. 23, when an angle of the optical path of light from the UV LED 21 with respect to the central axis O of the light emission region of the UV LED is b, the surface profile of the secondary lens 23 is formed such that the distance r from the light emitting point of the UV LED 21 to the light exiting point E of the surface of the secondary lens 23 gradually decreases as b increases. According to this profile, the angle of the optical path changes from b to b' (b>b') when UV light from the UV LED 21 is refracted through the surface of the secondary lens 23. Thus, a diffusion angle of UV light emitted from the UV LED 12 is vertically narrowed by the secondary lens 23, such that UV light can be radiated straighter. As a result, the amount of UV light radiated toward the ground or sky is reduced, such that UV light can be radiated further in a horizontal direction while being prevented from being radiated toward a person. In FIG. 23, the secondary lens has a cross-sectional shape similar to an ellipse divided along the minor axis.

Referring to FIGS. 21 to 23, the lens has a substantially elliptical cross-sectional shape in a plan view parallel to the substrate. In addition, the elliptical cross-sectional shape becomes smaller as the distance from the substrate increases.

When the surface profile of the secondary lens meets the aforementioned two conditions, an outer surface of the secondary lens is generally curved. In other words, the secondary lens has a shape like a spheroid or rugby ball cut in half in a longitudinal direction, as shown in FIG. 21.

In the above embodiment, the distance r from the light emitting point to the surface of the secondary lens gradually increases as the angle a increases, as seen in the X-X direction (lateral direction). Such a surface profile of the secondary lens may be formed within a predetermined range of angle a. For example, the surface profile may be formed in a range of 15°<a<60°. In addition, the surface of the secondary lens may further include a profile in which the distance r from the light emitting point to the surface of the secondary lens remains constant or gradually increases as the angle a increases, wherein the profile may be repeated as the angle a increases.

The UV LED 21 may be directly covered with the secondary lens 23 without any sealing member (see FIG. 21), or may be covered with a sealing member in the form of a primary lens 22, which, in turn, is covered with the secondary lens 23, as shown in FIGS. 22 and 23. The primary lens 22 may be integrally formed in a packaging process or may be disposed after being separately formed. Here, an outer surface of the primary lens 22 adjoins an inner surface of the secondary lens 23.

The inner surface of the secondary lens 23 is a surface through which light from the UV LED enters the secondary lens. Accordingly, when UV light from the UV LED enters the secondary lens at a right angle to the inner surface of the secondary lens, it is possible to minimize the amount of UV light reflected by the light entering surface of the secondary lens, irrespective of the presence or absence of the primary lens or a difference in medium between the primary lens and the secondary lens. Considering that the UV LED is a spot light source, it is desirable that the inner surface of the secondary lens be a hemisphere centered on the light emitting point of the UV LED. However, when a path of light emitted from the UV LED is changed by the primary lens, the inner surface of the secondary lens may be formed such that the light hits the inner surface at an angle of incidence of 0° (that is, the light enters the secondary lens at a right angle to the light entering surface) along the changed path.

Although the UV LED 21 is a spot light source, most insects are known to be more lured to a surface light source than a spot light source. Accordingly, it is desirable that light from the UV LED 21 be perceived as surface light by an insect. Therefore, light in the vicinity of the central axis O of the light emission region in which light intensity is concentrated needs to be diffused as much as possible. Here, preferably, vertical diffusion of light in the vicinity of the central axis of the light emission region is suppressed and lateral diffusion of the light is enhanced.

Figure 24:
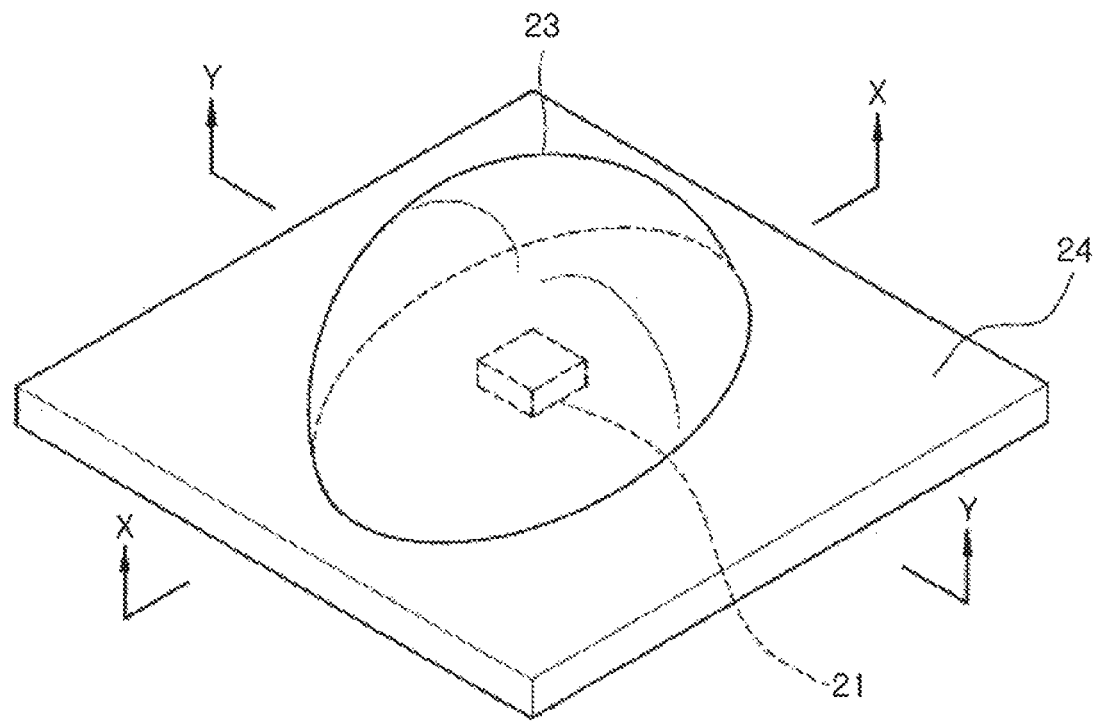
FIG. 24 is a perspective view of one embodiment of the UV LED light source used in the insect trap according to the present invention.
Figure 25:
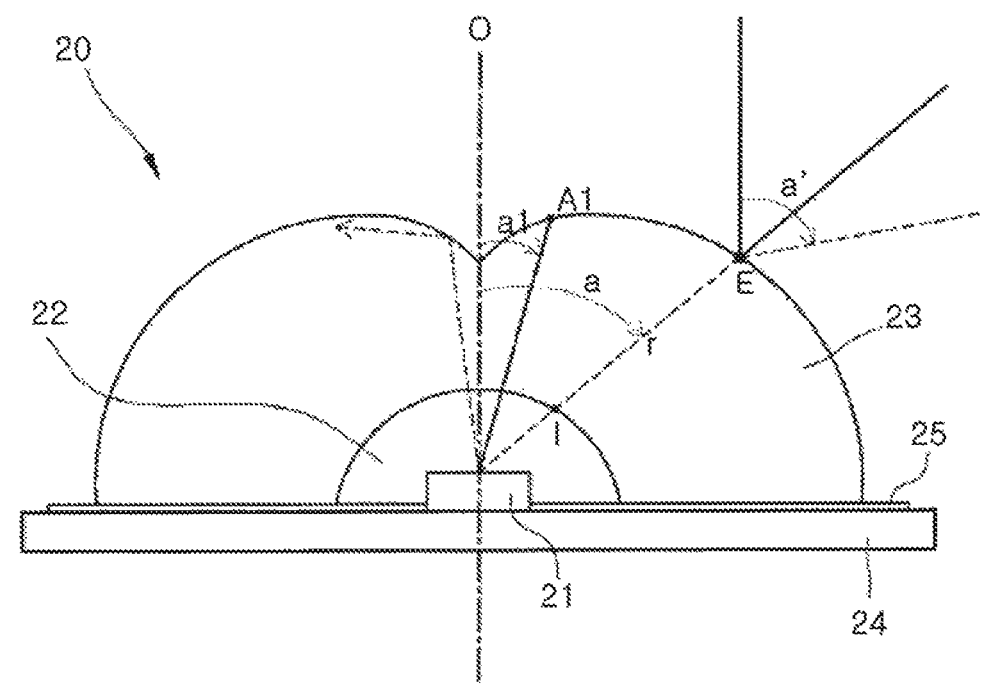
FIG. 25 is a sectional view taken along line X-X of FIG. 24.
Figure 26:
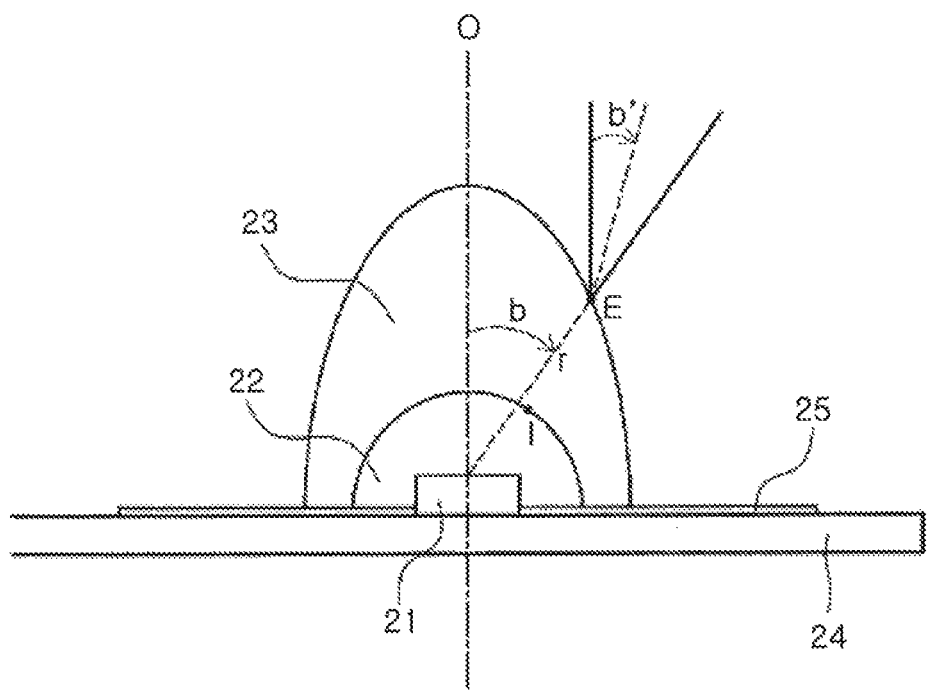
FIG. 26 is a sectional view taken along line Y-Y of FIG. 24.

FIG. 24 is a perspective view of another embodiment of the UV LED light source used in the insect trap according to the present invention, FIG. 25 is a sectional view taken along line X-X of FIG. 24, and FIG. 26 is a sectional view taken along line Y-Y of FIG. 24.

Referring to FIGS. 24 to 26, the UV LED light source according to this embodiment differs from the UV LED light source shown in FIGS. 21 to 23 in that a secondary lens further has a recessed region ($0<a<a1$) formed in the vicinity of a central axis O of the light emission region when viewed in the lateral direction (X-X direction). The recessed region extends slantly outward from the central axis O of the light emission region of the UV LED and gradually decreases in slope toward the outside (i.e. has a convex shape).

Referring to FIG. 25 along with FIG. 22, the secondary lens having the recessed region exhibits higher light diffusion efficacy than the secondary lens without the recessed region. In other words, in the recessed region, total internal reflection occurs, or a significant fraction of light reaching a surface of the lens is reflected to be redirected sideways. As a result, UV light concentrated in the vicinity of the central axis of the light emission region can be significantly diffused.

As shown in FIG. 25, which is a sectional view taken along line X-X of FIG. 24, within a region extending from the central axis to the point A1, UV light emitted from the UV LED 21 is reflected or totally internally reflected to be redirected sideways. Such a surface profile of the secondary lens allows UV light concentrated in the vicinity of the central axis O of the light emission region to be more diffused in the lateral direction than the surface profile of the secondary lens shown in FIG. 21. It should be understood that the recessed region is not shown in FIG. 26, which is a sectional view taken along line Y-Y of FIG. 24.

Preferably, a reflective film 25 is formed on a bottom surface of the secondary lens 23 or on the substrate 24, considering that some fraction of UV light can be returned to the substrate after being reflected or totally internally reflected by an outer surface E of the secondary lens. As a result, UV light form the UV LED can be further diffused by being reflected by the reflective film 25.

Preferably, the secondary lens is formed of a material having high UV transmittance and UV resistance. For example, the lens may be formed of quartz, PMMA (monomer content: 80% or more), or a fluorine-based synthetic resin (e.g., Teflon manufactured by DuPont). In addition, the outer surface of the secondary lens may be roughened by sandblasting or the like to more effectively convert light from the UV LED into surface light.

A wavelength of UV light emitted from the UV LED 21 may be appropriately selected depending on the kind of target insects. The UV LED 21 can exhibit improved insect trapping efficacy, as compared with a typical UV lamp, since UV intensity of the UV LED is concentrated near a peak wavelength due to a narrow spectrum half width of the UV LED and the peak wavelength can be precisely adjusted.

It was experimentally confirmed that the UV LED has higher insect attraction efficacy than a typical UV lamp.

The following is the result of an insect trapping test using an insect trap equipped with a UV LED lamp and an insect trap equipped with a typical commercially available BL lamp under the same conditions. Specifications of the two lamps are shown in Table 1.

TABLE 1

| | Voltage (V) | Current (A) | Power (W) | PF | Peak wavelength (Wp, nm) | Spectrum half width (Fw, nm) | Radiant flux ($\Phi$e, mW) | $\Phi$v (lm) |
|---|---|---|---|---|---|---|---|---|
| UV LED lamp | 220.1 | 0.034 | 4.98 | 0.66 | 367.94 | 9.24 | 759.19 | 5.7 |
| Black light lamp | 220.1 | 0.247 | 6.4 | 0.12 | 365.88 | 18.36 | 528.8 | 8.37 |

Although both of the lamps had similar peak wavelengths of about 365 nm, the UV LED lamp had a spectrum half width of one half that of the BL lamp and a luminosity of 133 mW/lm, which was more than twice that of the BL lamp (63 mW/lm).

The test was conducted twice in an outdoor barn, and the number (trap index) of insects trapped overnight is as follows.

TABLE 2

| Specie | Vector disease | Trap index B/L | Trap index UV LED | Mean trap rate (%) (Standard deviation) B/L | Mean trap rate (%) (Standard deviation) UV LED |
|---|---|---|---|---|---|
| Aedes vexans | West Nile Fever | 1 0 | 7 0 | 12.5 (—) | 87.5 (—) |
| Anopheles sinensis | Malaria | 296 316 | 1,028 2,500 | 16.8b (7.9) | 83.2a (7.9) |
| Culex pipiens | West Nile Fever | 118 104 | 497 536 | 17.8b (2.1) | 82.2a (2.1) |
| Cx. tritaeniorhynchus | J. Encephalitis | 687 452 | 3,307 3,196 | 14.8b (3.4) | 85.2a (3.4) |
| Mansonia uniforms | | 145 80 | 269 368 | 26.5b (12.1) | 73.5a (12.1) |
| Total | | 1,247 952 | 5,108 6,600 | 16.1b (4.9) | 83.9a (4.9) |

As can be seen from the results, the UV LED insect trap had trapping efficacy more than 5 times higher than that of the typical BL lamp insect trap. This is thought to be due to the fact that a UV LED has a much narrower spectrum half width than a typical UV lamp and thus can radiate UV light in a desired wavelength range in a concentrated manner, and light emitted from the UV LED has directivity and thus can be concentrated in a target area.

The UV LED 21 according to the present invention emits UV light having a peak wavelength of 365 nm. Although UV light in the UVA range is known to be able to attract insects, it is not known exactly which wavelengths in the UVA range are particularly effective in attracting insects. In fact, a lamp emitting UV light in the UVA region attracts more insects than a lamp emitting UV light outside the UVA region. However, since a UV LED has a much narrower spectrum half width than a UV lamp, it is necessary to determine at which peak wavelength UV light is more effective in attracting insects.

For this purpose, a paired test was conducted in which two Luralite traps (radiant flux: 500 mW) equipped with a UV LED lamp emitting UV light with a peak wavelength of 340 nm and a UV LED lamp emitting UV light with a peak wavelength of 365 nm, respectively, (wherein light from each of the lamps was converted into surface light) were used to trap houseflies.

A housefly trapping rate was determined by measuring the number of trapped houseflies among 50 houseflies. Here, the test was conducted inside a screened enclosure (1.8 m×3.7 m×1.8 m) in a dark laboratory. In addition, the houseflies were exposed to UV light from both of the Luralite traps at 27±1° C. and 64±4% RH for 1, 2, 4, 8, and 12 hours from morning, and there were two replicates in total under the same conditions except that the positions of the traps were exchanged.

TABLE 3

| Exposure time (hour) | Peak wavelength: 365 nm (radiant flux: 500 mW, UV converted into surface light) | Peak wavelength: 340 nm (radiant flux: 500 mW, UV converted into surface light) | Total |
|---|---|---|---|
| 1 | 11.0 ± 1.4a[1)] | 3.0 ± 1.4a | 14.0 ± 0.0 |
| 2 | 23.0 ± 4.2a | 5.0 ± 1.4a | 28.0 ± 2.8 |
| 4 | 56.0 ± 5.7a | 11.0 ± 1.4a | 67.0 ± 4.2 |
| 8 | 79.0 ± 7.1a | 14.0 ± 0.0b | 93.0 ± 7.1 |
| 12 | 84.0 ± 2.8a | 16.0 ± 2.8b | 100.0 ± 0.0 |

Briefly, a trapping rate was measured on two Luralite traps (radiant flux: 500 mW) equipped with a UV LED lamp emitting UV light with a peak wavelength of 340 nm and a UV LED lamp emitting UV light with a peak wavelength of 365 nm, respectively, (wherein light from each of the lamps was converted into surface light) inside a screened enclosure containing 50 houseflies in a dark laboratory for 12 hours from morning, and there were two replicates in total under the same conditions except that the positions of the traps were switched.

In Table 3, 1) means that, in a corresponding row, there is no significant difference in trapping rate between the two traps (p>0.05; paired t-test using SPSS PC software).

As shown in Table 3, the UV LED (radiant flux: 500 Mw) emitting surface light at a peak wavelength of 365 nm exhibited a higher housefly trapping rate upon exposure to UV for 8 hours and 12 hours than the UV LED (radiant flux: 500 Mw) emitting surface light at a peak wavelength of 340 nm. Therefore, it can be seen that UV light having a peak wavelength of 365 nm has higher trapping efficacy than UV light having a peak wavelength of 340 nm.

Based on the above experimental results, in the present invention, a UV LED 20 emitting UV light at a peak wavelength of 365 nm is used as a light source. It should be understood that a UV LED emitting UV light at a peak wavelength of about 360 nm to about 370 nm is expected to have an equivalent effect.

According to the present invention, light from the UV LED 21, which is a spot light source, can be converted into surface light to a considerable extent using the secondary lens 23 having a specific shape as shown in FIGS. 21 to 26.

A difference in insect attraction efficacy between spot light and surface light can be confirmed by the following experimental results.

For this purpose, a paired test was conducted in which two Luralite traps (radiant flux: 1,000 mW, peak wavelength: 365 nm) equipped with a UV LED lamp emitting UV light converted into surface light and a UV LED lamp emitting direct UV light (i.e., UV light not converted into surface light) were used to trap houseflies under darkroom conditions.

A housefly trapping rate was determined by measuring the number of trapped houseflies among 50 houseflies. Here, the test was conducted inside a screened enclosure (1.8 m×3.7 m×1.8 m) in a dark laboratory. In addition, the houseflies were exposed to UV light from both of the Luralite traps at 26±1° C. and 62±4% RH for 1, 2, 4, 8, and 12 hours from morning, and there were four replicates in total under the same conditions except that the positions of the traps were exchanged.

As shown in Table 4, the trap using the UV LED lamp emitting UV light converted into surface light exhibited a higher housefly trapping rate upon exposure to UV for 2, 4, 8, and 12 hours than the trap using the UV LED lamp emitting direct UV light. Therefore, it can be seen that the trap using the UV LED lamp (radiant flux: 1000 mW, peak wavelength: 365 nm) has higher trapping efficacy than the trap using the UV LED lamp (radiant flux: 1000 mW, peak wavelength: 365 nm) emitting direct UV light.

TABLE 4

| Exposure time (hour) | Direct UV light (radiant flux: 1,000 mW, peak wavelength: 365 nm) | UV light converted into surface light (radiant flux: 1,000 mW, peak wavelength: 365 nm) | Total |
|---|---|---|---|
| 1 | 3.0 ± 1.2a[1)] | 7.0 ± 2.6a | 10.0 ± 2.3 |
| 2 | 6.5 ± 4.1b | 29.5 ± 12.8a | 36.0 ± 12.8 |
| 4 | 15.0 ± 8.4b | 52.0 ± 10.5a | 67.0 ± 9.0 |
| 8 | 22.0 ± 8.5b | 76.0 ± 10.3a | 98.0 ± 2.8 |
| 12 | 22.5 ± 9.1b | 77.5 ± 9.1a | 100.0 ± 0.0 |

Briefly, a trapping rate was measured on two Luralite traps (radiant flux: 1,000 mW, peak wavelength: 365 nm) equipped with a UV LED lamp emitting UV light converted into surface light and a UV LED lamp emitting direct UV light inside a screened enclosure containing 50 houseflies in a dark laboratory for 12 hours from morning, and there were four replicates in total under the same conditions except that the positions of the traps were switched.

In Table 4, 1) means that, in a corresponding row, there is no significant difference in trapping rate between the two traps (p>0.05; paired t-test using SPSS PC software).

As described above, according to the present invention, it is possible to provide quasi-surface emission by placing the lenses 22, 23 over each of the separately arranged UV LEDs 21 without using a separate optical component for surface emission (for example, a diffusion plate, etc.), thereby further improving insect trapping efficacy.

Second Embodiment 2000

An insect trap 2000 according to a second embodiment of the present invention is different from the insect trap 1000 according to the first embodiment in terms of the shape of a UV LED light source and control of the light radiation angle of the UV LED light source, and description of the same components as in the first embodiment will be omitted for clarity.

Figure 27:
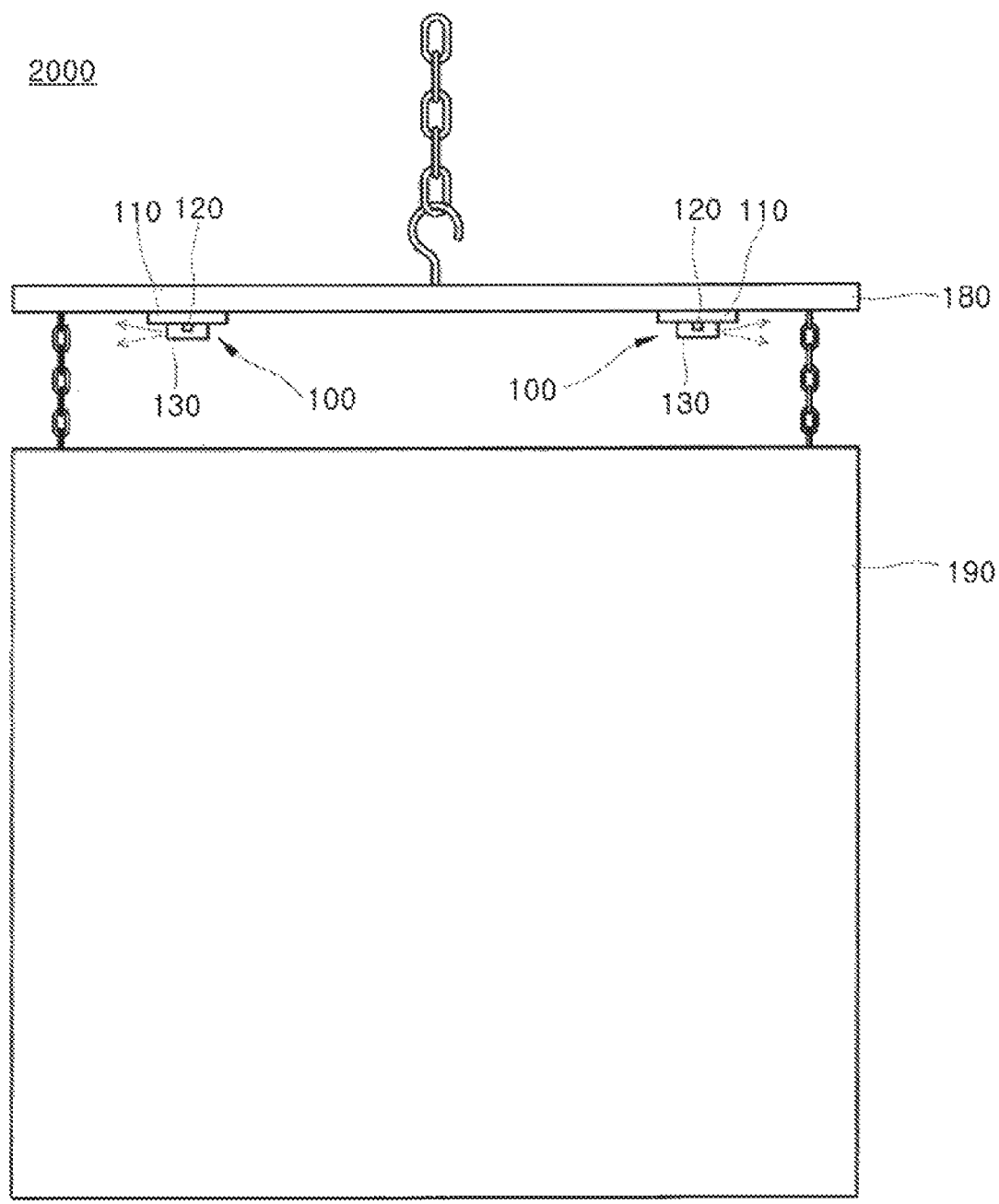
FIG. 27 is a side view of an insect trap according to a further embodiment of the present invention.

Referring to FIG. 27, the insect trap according to the second embodiment of the present invention includes a trapping unit 190 and an attraction unit placed above the trapping unit to be separated therefrom, wherein the attraction unit includes a UV LED mount 180. A UV LED light source 100 is mounted on the UV LED mount 180 to radiate UV light sideways. An insect attracted to UV light and flying in the vicinity of the UV LED mount 180 or the trapping unit 190 is drawn into an air flow generated by a fan (not shown) of the trapping unit 190 to be caught in the trapping unit 190.

In order to attract distant insects, it is necessary that UV light be radiated sideways. If UV LEDs are disposed on a side surface of the UV LED mount 180 to radiate UV light sideways, the required number of UV LEDs is greatly increased and the required height or thickness of the UV LED mount is considerably increased. Increases in both the number of UV LEDs and the thickness of the UV LED mount make it impossible to obtain a compact insect trap.

According to the present invention, UV LEDs 120 configured to radiate UV light sideways are mounted on a surface of the thin and flat UV LED mount 180, whereby the required number of UV LEDs can be reduced and the UV LED mount can be made compact.

Advantageously, a flat substrate with the UV LED 120 mounted thereon can be easily mounted on the flat UV LED mount 180.

Thus, the insect trap according to the second embodiment of the present invention includes a means formed in front of the UV LED to allow UV light downwardly emitted from the UV LED 120 mounted on the lower surface of the UV LED mount 180 to be redirected sideways.

Figure 28:
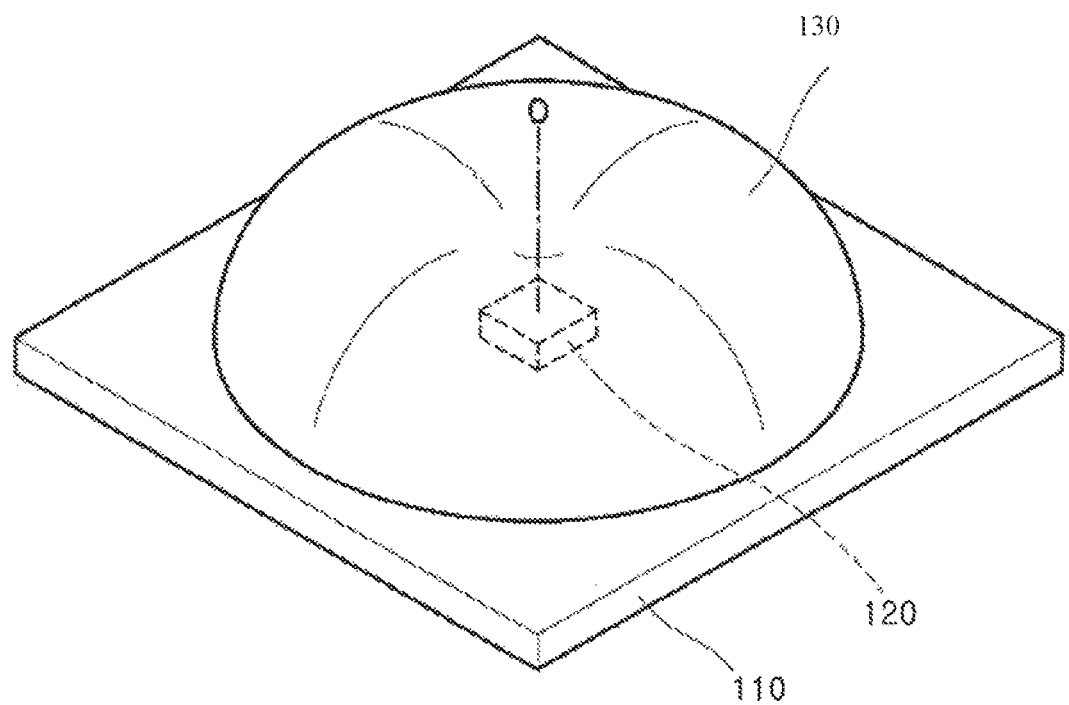
FIG. 28 is a perspective view of a further embodiment of a UV LED light source used in the insect trap according to the present invention.

FIG. 28 is a perspective view of a first embodiment of a light source used in the insect trap according to the present invention.

Figure 29:
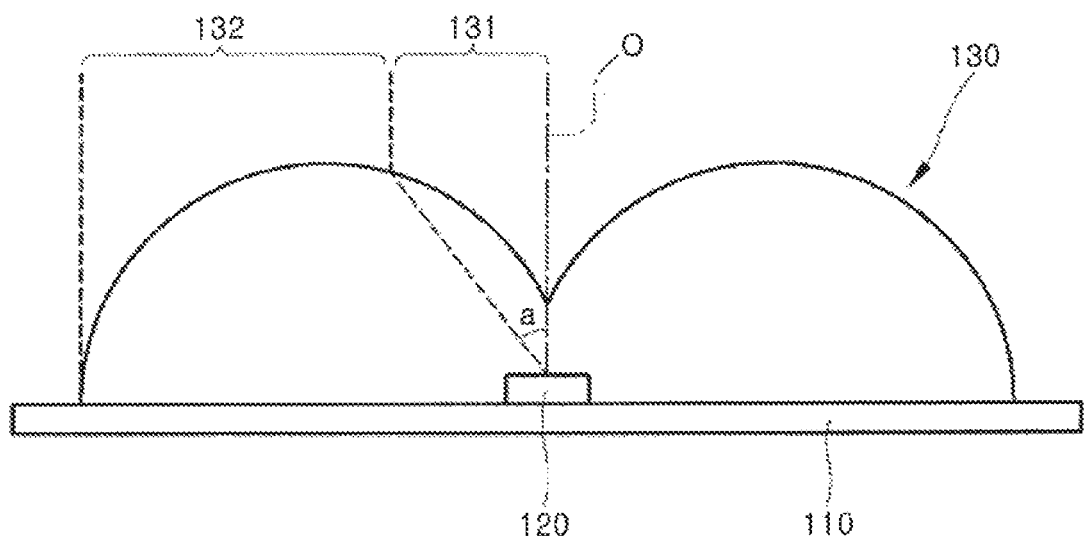
FIG. 29 is a side sectional view of the UV LED light source of FIG. 28.

FIG. 29 is a side sectional view of the light source of FIG. 28. Referring to FIG. 28, the light source is a UV LED.

It was experimentally confirmed that the UV LED is much more effective in attracting insects than a typical UV lamp.

Referring to FIGS. 28 and 29, the UV LED 120 according to the present invention is mounted on a flat substrate 110, and a lens 130 is disposed on the substrate to cover the UV LED 120.

A central axis of light emitted from the UV LED 120 is aligned with a central portion of the lens 130, and the central portion of the lens 130 is recessed toward the UV LED 120. In addition, the lens 130 has a profile which is upwardly inclined from the center of the recessed portion (i.e., the central axis O of light emitted from the UV LED 120) toward the outside, wherein the slope of the profile gradually decreases toward the outside. The profile provides a total internal reflection surface 131. For example, light emitted at an angle smaller than a predetermined angle a with respect to the central axis O is totally internally reflected by the total internal reflection surface 131 to be redirected sideways.

In addition, the lens 130 has a refraction surface extending outward from the total reflection surface 131. The refraction surface 132 is a surface though which light traveling through a medium of the lens exits the lens. Light exiting through the refraction surface 132 includes light components emitted at an angle larger than the predetermined angle a to directly reach the refraction surface and light components emitted at an angle smaller than the predetermined angle a and totally internally reflected by the total reflection surface 131 to be redirected to the refraction surface.

As such, the UV LED light source shown in FIGS. 28 and 29 allows all the light components emitted from the UV LED to be redirected sideways.

Figure 33:
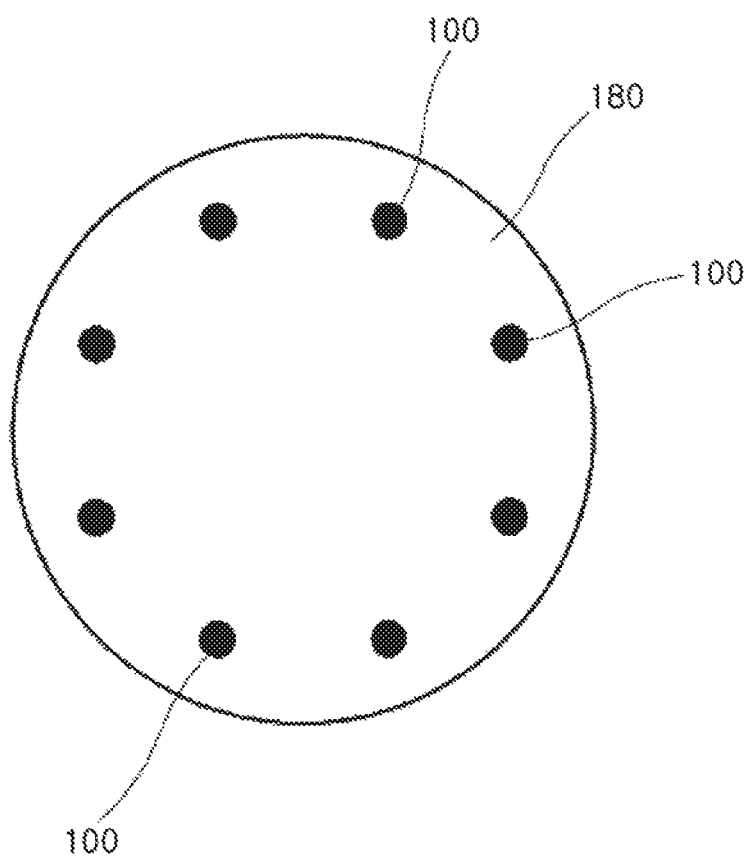
FIG. 33 is a view of UV LED light sources mounted on the insect trap according to the present invention.
Figure 34:
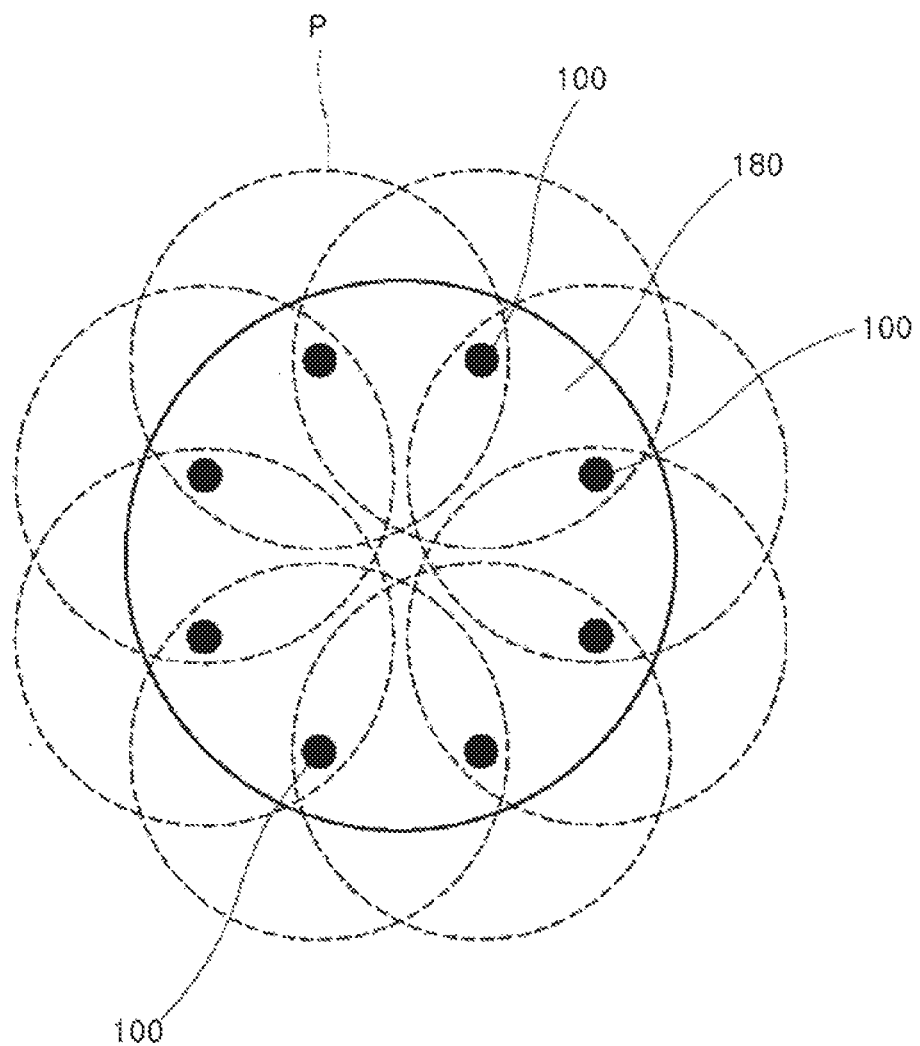
FIG. 34 is a view of a light radiation pattern of the UV LED light source of FIG. 28 mounted on the UV LED mount of FIG. 33.

FIG. 33 is a view of the UV LED light source according to the first embodiment, mounted on the UV LED mount of the insect trap of the present invention, and FIG. 34 is a view of a radiation pattern of the UV LED light source mounted on the UV LED mount of FIG. 33. Referring to FIGS. 33 and 34, when a plurality of UV LED light sources 100 according to the first embodiment shown in FIGS. 28 and 29 is radially mounted on the flat surface of the UV LED mount 180, a directional pattern P of UV light from each of the UV LED light sources spreads sideways, such that light from the UV LED light source can be perceived as surface light by distant insects. In other words, according to the present invention, it is possible to provide quasi-surface emission by disposing the lens 130 over each of the separately arranged UV LEDs without a separate optical component for surface emission.

Figure 30:
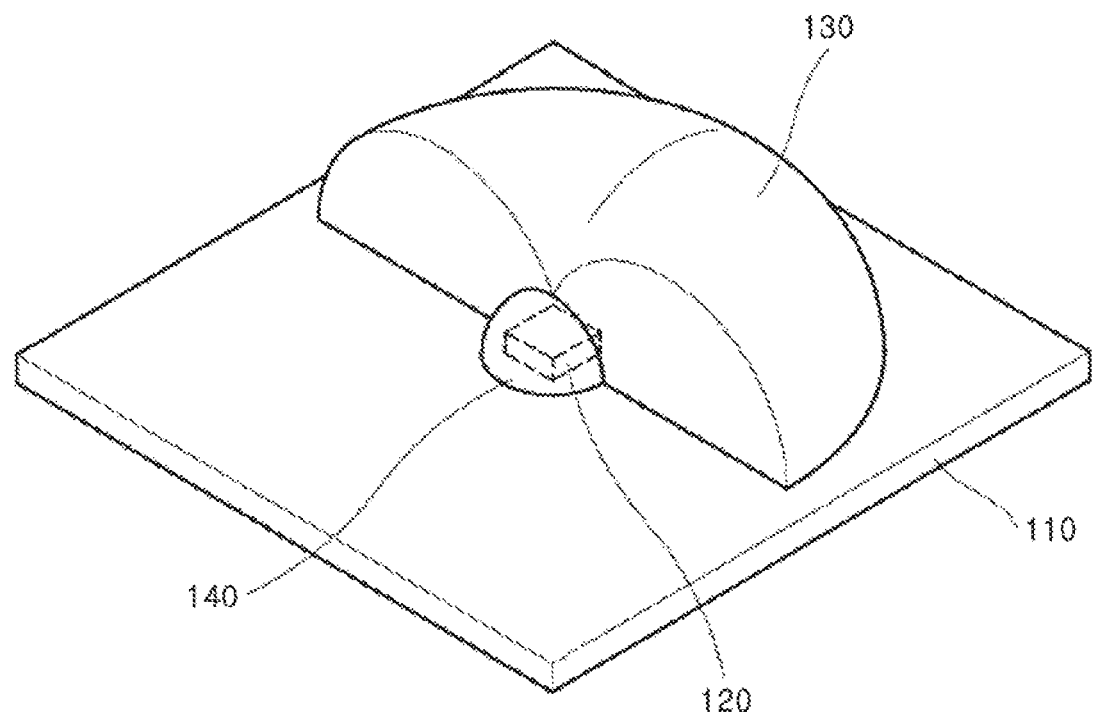
FIG. 30 is a perspective view of yet another embodiment of a UV LED light source used in the insect trap according to the present invention.
Figure 31:
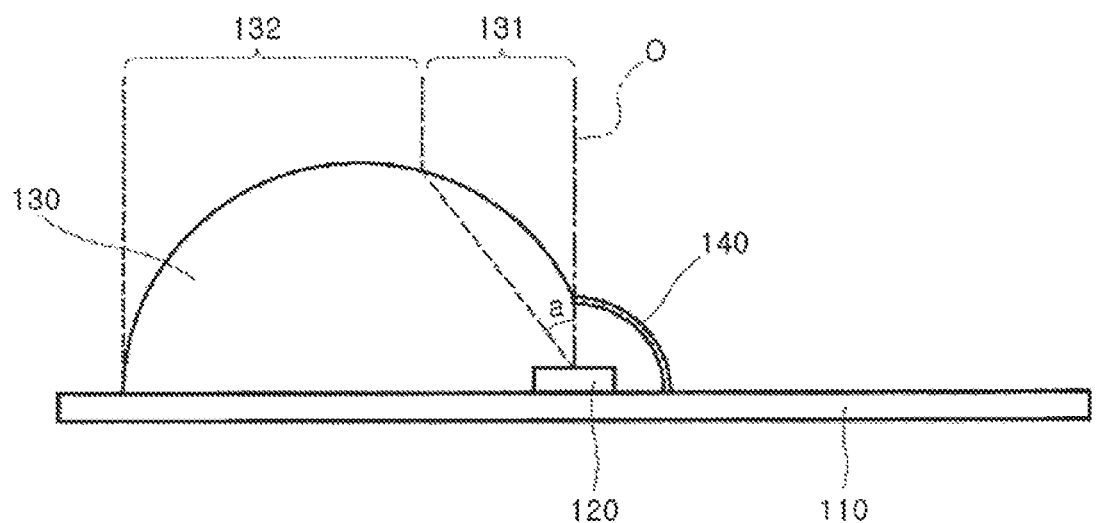
FIG. 31 is a side sectional view of the UV LED light source of FIG. 30.
Figure 32:
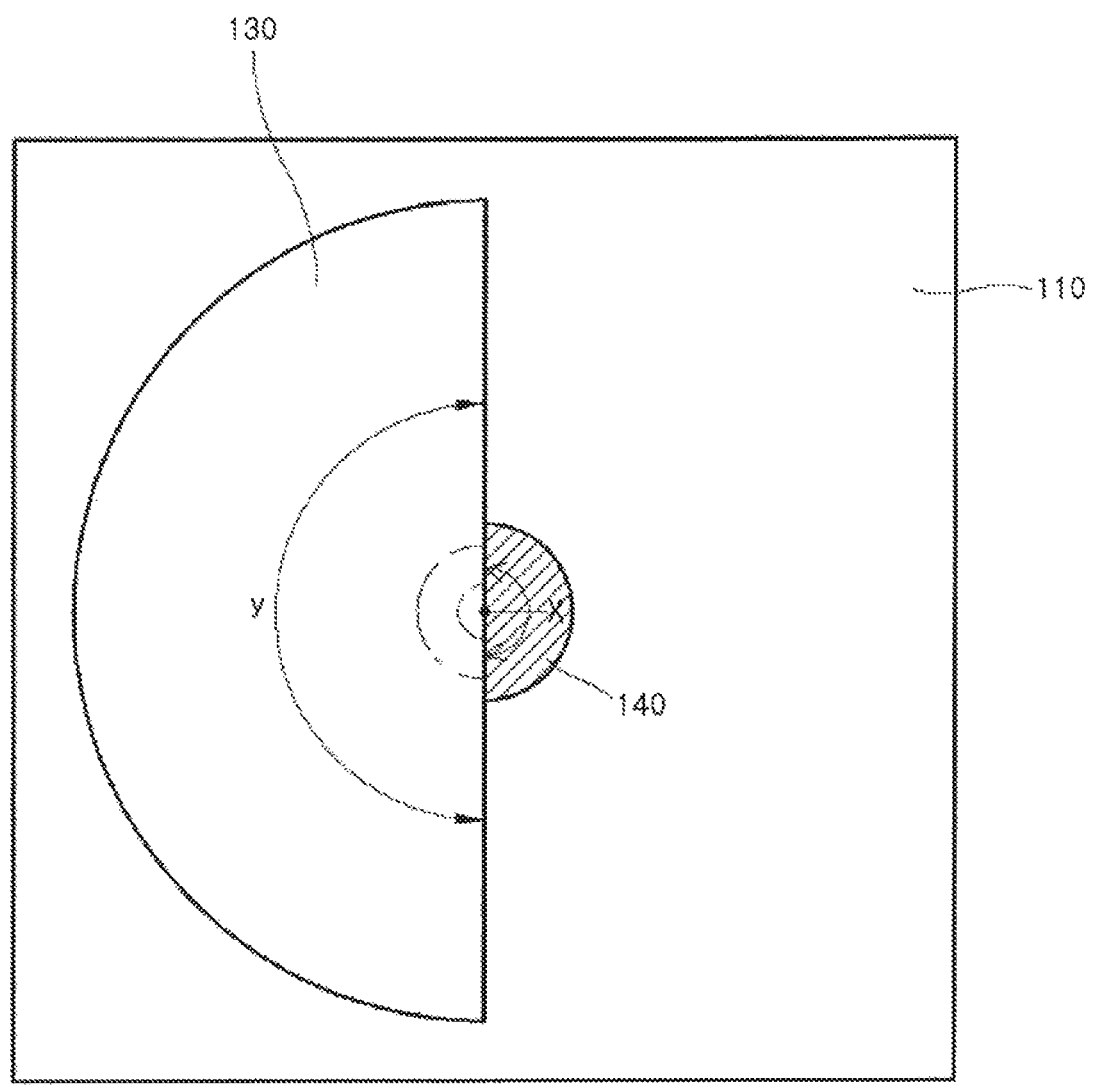
FIG. 32 is a plan view of the UV LED light source of FIG. 30.

FIG. 30 is a perspective view of a second embodiment of the UV LED light source used in the insect trap according to the present invention, FIG. 31 is a side sectional view of the UV LED light source of FIG. 30, and FIG. 32 is a plan view of the UV LED light source of FIG. 30.

In this embodiment, the UV LED light source includes a UV LED 120 mounted on a flat substrate 110, a lens 130 disposed on the substrate to cover half of the UV LED, and a reflective film 140 disposed on the substrate to cover the other half of the UV LED.

The lens 130 has substantially the same profile as the lens 130 according to the first embodiment shown in FIGS. 28 and 29 except that the profile of the lens 130 covers "y" degrees rather than 360 degrees. Here, "y" may range from 90 to 240 degrees, without being limited thereto.

The reflective film 140 may take the form of a paraboloid centered on a light emission center of the UV LED. In other words, the reflective film 140 has a parabolic shape in cross-section, wherein the center of the parabola corresponds to the light emission center of the UV LED, as shown in FIG. 31.

Accordingly, light components emitted from the UV LED 120 toward the lens 130 are redirected in the same manner as in the first embodiment, and light components emitted from the UV LED 120 toward the reflective film 140 are reflected by the reflective film 140 to be redirected in a horizontal direction and then exits the lens 130 through the refraction surface 132. Since the reflective film 140 takes the form of a paraboloid centered on the light emission portion of the UV LED, all the light components emitted from the UV LED 120 toward the reflective film 140 are reflected by the reflective film to be redirected in the horizontal direction. As a result, all the light components from the UV LED are radiated toward the left, as viewed in FIG. 31, and are radiated to a 180 degree region y at the left side, as viewed in FIG. 32. In other words, UV light from the UV LED 120 is radiated at any angle within "y" degrees in plan view.

Referring to FIG. 31, the reflective film 140 may be formed on a surface of the lens 130. In other words, the reflective film 140 may be formed by attaching a material having high reflectivity to UV light to a paraboloid surface of the lens. For example, a left half of the lens 130 (i.e., a portion having a profile of the total internal reflection surface and the refraction surface) and a right half of the lens (i.e., a portion having a paraboloid shape) are integrally formed with one another, followed by attachment of the material to a surface of the right half of the lens, thereby fabricating both the lens 130 and the reflective film 140. As such, when an inner space of the reflective film 140 is filled with the same material as the lens, the number of medium boundaries through which UV light passes can be reduced, thereby preventing reduction in intensity of UV light.

The angle y of the lens and the angle x of the paraboloid may complement each other. For example, when the angle of the lens is 240 degrees, the angle of the paraboloid may be 120 degrees.

Figure 35:
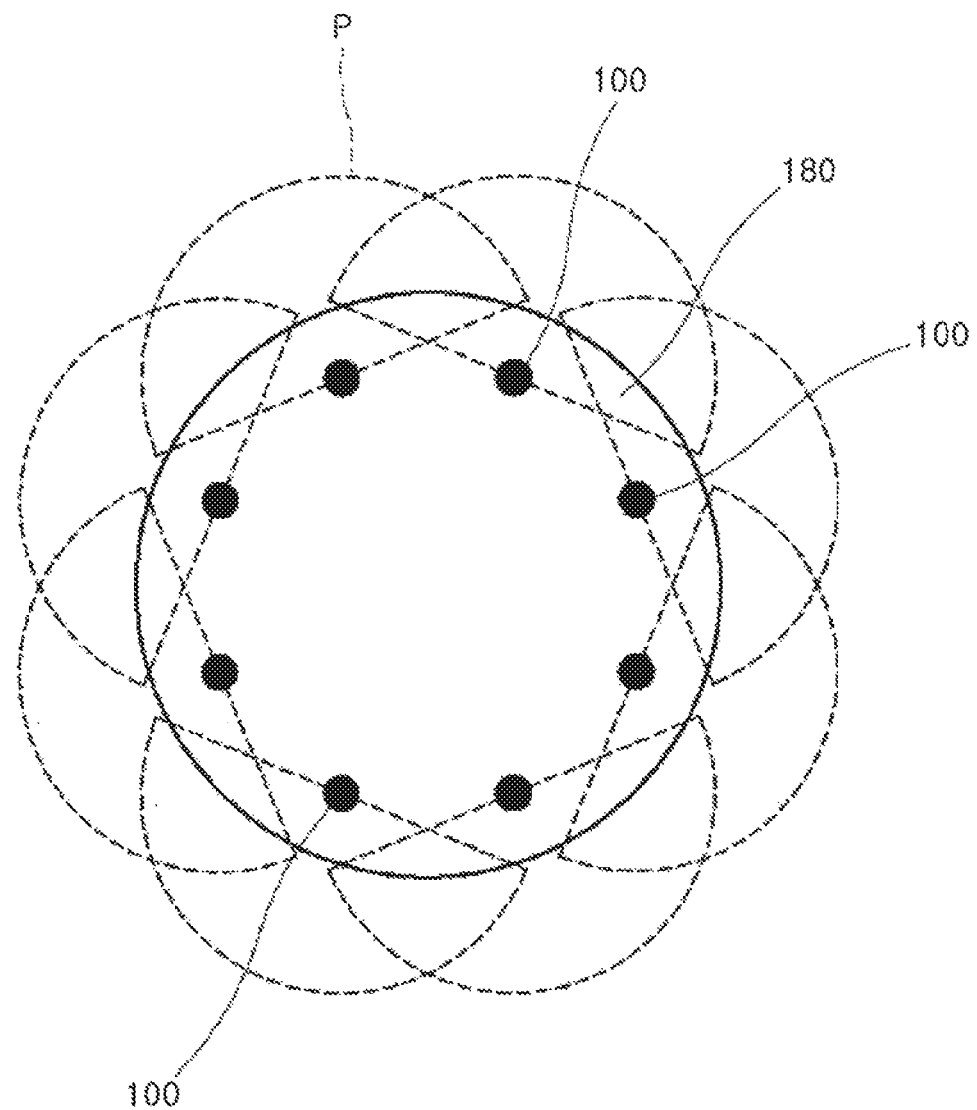
FIG. 35 is a view of a light radiation pattern of the UV LED light source of FIG. 30 mounted on the UV LED mount of FIG. 33.

Referring to FIG. 33, which is a view of the UV LED light source mounted on the UV LED mount of the insect trap of the present invention, and FIG. 35, which is a view of a radiation pattern of the UV LED light source according to the second embodiment mounted on the UV LED mount of FIG. 33, a plurality of UV LED light sources 100 according to the second embodiment shown in FIGS. 30 to 32 may be radially mounted on the flat surface of the UV LED mount 180 with the reflecting surface 140 facing the center of the UV LED mount 180 and the lens 130 facing away from the center of the UV LED mount 180, such that a directional pattern P of UV light from the UV LED can be further concentrated at the outside of the UV LED mount 180. Thus, the UV LED light source according to the second embodiment allows intensity of UV light therefrom to be further concentrated at the outside thereby attracting more distant insects than the UV LED light source according to the first embodiment, despite being slightly less effective in providing quasi-surface emission than the UV LED light source according to the first embodiment.

As a modification of the second embodiment, the UV LED light source 100 may be only composed of the reflective film 140 without the lens including the total internal reflection surface 131 and the refraction surface 132. Here, the reflective film may extend to a region at which the lens would otherwise be provided to completely cover the UV LED. In this embodiment, the reflective film 140 may have a paraboloid shape to reflect all light components from the UV LED in a substantially horizontal direction, such that UV light emitted from the UV LED can be redirected sideways.

According to the present invention, the aforementioned components may be selectively integrally formed with one another. For example, the insect trap may be designed in such a way that the substrate 110, the UV LED 120, and the lens 130 are integrally formed with one another, thereby fabricating the UV LED light source 110, which, in turn, is mounted on the UV LED mount 180. Alternatively, the insect trap may be designed in such a way that the substrate 110 is integrally formed with the UV LED 120 to fabricate the UV LED light source 100 and the lens 130 and/or the reflective film 140 are separately formed on the UV LED mount 180, followed by replaceably mounting the UV LED light source 100 at a position on the UV LED mount 180 where the lens 130 and the reflective film 140 are formed. In other words, components for redirecting UV light from the UV LED may be integrally formed on the UV LED mount 180 of the insect trap, while the substrate and the UV LED mounted on the UV LED mount can be replaced, as needed.

Although some embodiments have been described herein, it should be understood that these embodiments are provided for illustration only and are not to be construed in any way as limiting the present invention, and that various modifications, changes, alterations, and equivalent embodiments can be made by those skilled in the art without departing from the spirit and scope of the invention. In addition, it should be understood that, although the action and effect of the features of the present invention have not been explicitly described, predictable effects of the features should also be recognized.

We claim:

1. An ultraviolet light emitting diode (UV LED) light source provided to an insect trap and radiating ultraviolet (UV) light, the UV LED light source comprising:
    a UV LED configured to emit light;
    a substrate on which the UV LED is mounted, the substrate being directly or indirectly secured to the insect trap; and
    a lens disposed in front of the UV LED and configured to allow all light emitted from the UV LED to be redirected sideways,
    wherein a surface of the lens has a first part that is disposed around a central part of the lens and configured to reflect light emitted at an angle smaller than a predetermined angle such that reflected light is redirected the sideways through a second part of the surface of the lens, the second part being apart from the central part by the first part.

2. The UV LED light source according to claim 1, wherein the lens has a horizontal (X-X) sectional shape in which, at least in some sections, a distance from a light emitting point of the UV LED to an outer surface (E) of the lens increases with increasing distance from a central axis of a light emitting region of the UV LED, the lens comprising a recessed region in horizontal (X-X) sectional view which is centered on the central axis of the light emitting region of the UV LED and extends from the central axis of the light emitting region to a predetermined angle (a1).

3. The UV LED light source according to claim 2, wherein the recessed region extends slantly outward from the central axis of the light emitting region of the UV LED, with slope gradually decreasing outward.

4. The UV LED light source according to claim 2, wherein total internal reflection occurs at least part of the recessed region.

5. The UV LED light source according to claim 1, wherein the lens has a horizontal (X-X) sectional shape substantially the same as half of an ellipse divided along a major axis thereof.

6. The UV LED light source according to claim 1, wherein the lens has a vertical (Y-Y) sectional shape in which a distance from a light emitting point of the UV LED to an outer surface of the lens decreases with increasing distance from a central axis of a light emitting region of the UV LED.

7. The UV LED light source according to claim 1, wherein the lens has a vertical (Y-Y) sectional shape substantially the same as half of an ellipse divided along a minor axis thereof.

8. The UV LED light source according to claim 1, wherein the lens has an elliptical shape with a horizontal (X-X) major axis and a vertical (Y-Y) minor axis in a plan view parallel to the substrate.

9. The UV LED light source according to claim 1, wherein a portion of the lens facing the UV LED is formed with a light entering surface (I) formed to allow light emitted from the UV LED to enter the lens at a right angle to the light entering surface, the light entering surface having a hemispherical shape centered on a light emitting point of the UV LED.

10. An insect trap comprising: a light emitting structure including a substrate and an ultraviolet light emitting diode (UV LED) light source disposed on the substrate;
    a lens disposed to cover the UV LED light source and including a reflective film disposed on a surface of the lens, the reflective film configured to reflect emitted light such that the emitted light reflected by the reflective film is radiated sideways through the lens; and a trapping unit disposed adjacent to the UV LED light source, wherein a center line of an UV emission region of the UV LED light source is substantially radially arranged outward from the center of the insect trap.

11. The insect trap according to claim 10, wherein a horizontal diffusion angle of light from the UV LED light source is greater than a vertical diffusion angle of light from the UV LED light source.

12. The insect trap according to claim 10, further comprising:

a motion sensor, wherein any of the UV LED light sources radiating ultraviolet (UV) light toward a region in which motion of a person is detected by the motion sensor is controlled to be turned off.

13. The insect trap according to claim 10, further comprising:

an illuminance sensor measuring both illuminance of visible light and illuminance of ultraviolet (UV) light, wherein the UV LED light sources are turned on/off or controlled in light intensity based on the measured illuminance values.

14. The insect trap according to claim 10, further comprising:

a fan generating an air flow around the insect trap to capture an insect attracted around the insect trap, the fan being operated when an insect is detected to be present around the insect trap, an infrared light emitting unit emitting infrared light toward a region in which an air flow is generated by the fan; and an infrared receiving unit receiving infrared light emitted from the infrared light emitting unit in order to detect presence of an insect around the insect trap.

15. An insect trap comprising:

a trapping unit capturing an insect attracted by ultraviolet light (UV) light;

an ultraviolet light emitting diode (UV LED) mount disposed above the trapping unit to be separated therefrom; and a UV LED light source mounted on the UV LED mount and radiating UV light to attract an insect, wherein the UV LED light source comprises a UV LED and a substrate on which the UV LED is mounted, and is mounted on the UV LED mount with a central axis of a light emission direction of the UV LED facing downward, the UV LED light source further comprising a conversion unit disposed in front of the UV LED to redirect UV light from the UV LED sideways, wherein the conversion unit comprises a reflective film reflecting UV light emitted from the UV LED sideways, the reflective film taking the form of a paraboloid which is centered on a light emitting point of the UV LED and allows UV light reflected thereby to be radiated toward the outside of the UV LED mount.

16. The insect trap according to claim 15, wherein the conversion unit comprises a lens redirecting UV light from the UV LED sideways.

17. The insect trap according to claim 16, wherein the lens comprises a total internal reflection surface extending slantly outward from the central axis (O) of the light emission direction of the UV LED with a slope gradually decreasing outwards, such that light components emitted from the UV LED at an angle smaller than a predetermined angle with respect to the central axis of the light emission direction can be totally internally reflected by the total internal reflection surface to be redirected sideways.

18. The insect trap according to claim 17, wherein the lens further comprises a refraction surface extending outward from the total internal reflection surface to refract light components reflected by the total internal reflection surface and light components directly reaching the refraction surface without being reflected by the total internal reflection surface.

19. The insect trap according to claim 16, wherein the lens extends a predetermined angle around the center thereof to face the outside of the UV LED mount, and the light reflected by the reflective film is radiated toward the outside through the lens, the reflective film being formed on a surface of the lens.

* * * * *